United States Patent
Bloodworth et al.

(10) Patent No.: US 7,346,253 B2
(45) Date of Patent: Mar. 18, 2008

(54) FIBER OPTIC DROP CABLE SLACK STORAGE RECEPTACLE

(75) Inventors: Stephen G. Bloodworth, Ft. Worth, TX (US); Brad N. Grunwald, Euless, TX (US); John A. Keenum, Keller, TX (US); John J. Napiorkowski, Irving, TX (US); Jason B. Reagan, The Colony, TX (US); Harley J. Staber, Coppell, TX (US); Rodger A. Tenholder, Saginaw, TX (US); Chanh C. Vo, Arlington, TX (US); Terry L. Cooke, Hickory, NC (US); Tory A. Klavuhn, Newton, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 156 days.

(21) Appl. No.: 10/746,411

(22) Filed: Dec. 24, 2003

(65) Prior Publication Data

US 2005/0145522 A1   Jul. 7, 2005

(51) Int. Cl.
*G02B 6/00*   (2006.01)
(52) U.S. Cl. .................... 385/135; 385/134
(58) Field of Classification Search .............. 385/134, 385/135
See application file for complete search history.

(56) References Cited

U.S. PATENT DOCUMENTS

| | | | |
|---|---|---|---|
| 4,428,645 A * | 1/1984 | Korbelak et al. | 385/135 |
| 4,800,588 A | 1/1989 | Poster, Jr. | 379/142 |
| 4,850,014 A | 7/1989 | Gillis et al. | 379/399 |
| 4,890,318 A | 12/1989 | Crane et al. | 379/399 |
| 5,071,220 A * | 12/1991 | Ruello et al. | 385/135 |
| 5,420,958 A | 5/1995 | Henson et al. | 385/135 |
| 5,668,911 A | 9/1997 | Debortoli | 385/135 |
| 5,978,472 A | 11/1999 | Tuvy et al. | 379/399 |
| 6,028,769 A | 2/2000 | Zurek | 361/704 |
| 6,031,300 A | 2/2000 | Moran | 307/119 |
| 6,061,492 A | 5/2000 | Strause et al. | 385/135 |
| 6,249,633 B1 | 6/2001 | Wittmeier, II et al. | 385/135 |
| D449,824 S | 10/2001 | Higa et al. | D13/184 |
| 6,383,034 B1 | 5/2002 | Blake et al. | 439/713 |
| 6,385,381 B1 | 5/2002 | Janus et al. | 385/135 |
| 6,560,394 B1 | 5/2003 | Battey et al. | 385/135 |
| 6,625,375 B1 | 9/2003 | Mahony | 385/135 |
| 6,661,961 B1 | 12/2003 | Allen et al. | 385/135 |

(Continued)

*Primary Examiner*—Jennifer Doan
(74) *Attorney, Agent, or Firm*—Keith A. Roberson

(57) ABSTRACT

A slack storage receptacle for storing an excess length of a pre-connectorized fiber optic drop cable extending between an optical connection terminal and a network interface device (NID) includes a housing and a storage means disposed within the housing for receiving the drop cable such that the drop cable slack is stored external to the NID. The slack storage receptacle may be secured to an exterior wall of a subscriber premises and the NID mounted thereon. Alternatively, the slack storage receptacle may be positioned around and formed to the NID. Alternatively, the slack storage receptacle may be buried in the ground adjacent the NID. The drop cable slack may be wound onto the storage means after deployment. Alternatively, the slack storage receptacle may be pre-assembled, shipped to the subscriber premises, and the drop cable unwound from the storage means with the drop cable slack remaining wound on the storage means.

33 Claims, 8 Drawing Sheets

U.S. PATENT DOCUMENTS

| | | |
|---|---|---|
| 6,721,484 B1 | 4/2004 | Blankenship et al. ....... 385/135 |
| 6,795,552 B1 | 9/2004 | Stanush et al. ........ 379/413.01 |
| 6,815,612 B2 | 11/2004 | Bloodworth et al. ......... 174/50 |
| 6,990,192 B1 | 1/2006 | Denovich et al. ...... 379/399.01 |
| 7,035,399 B2 | 4/2006 | Gemme et al. ........ 379/413.03 |
| 2003/0103750 A1* | 6/2003 | Laporte et al. ............. 385/134 |
| 2005/0111800 A1* | 5/2005 | Cooke et al. ............... 385/100 |
| 2006/0067522 A1 | 3/2006 | Paulsen ................. 379/413.02 |

* cited by examiner

FIBER OPTIC DROP CABLE SLACK STORAGE RECEPTACLE

BACKGROUND OF THE INVENTION

1. Field of the Invention

The present invention relates generally to a storage receptacle for a fiber optic drop cable, and more particularly, to a fiber optic drop cable slack storage receptacle for storing and protecting an excess length of a pre-connectorized fiber optic drop cable in an optical communications network.

2. Description of the Related Art

The telecommunications industry has recognized the many advantages of fiber optic cable, including a significantly higher bandwidth and greater performance and reliability than conventional copper wire systems. Despite the many advantages, extremely high installation costs have discouraged service providers from deploying continuous fiber optic networks extending from their central office facilities all the way to subscriber premises. As used herein, "fiber-to-the-premises" (FTTP) refers to the deployment of an optical fiber network that extends continuously to the subscriber premises. Along the primary distribution lines of a communications network, the volume of traffic and the number of customers often justify the high installation cost of optical fiber. However, thus far, the additional cost of deploying optical fiber to remote, individual subscriber premises has far outweighed the potential benefits to service providers.

Therefore, instead of implementing FTTP networks, service providers have developed various strategies to provide certain of the benefits of fiber optic networks, without actually incurring the costs associated with deploying optical fiber all the way to the home (or other subscriber premises). One such strategy is known as "fiber-to-the-curb" (FTTC), in which optical fiber extends from the service provider's central office to local terminals (also referred to as outside plant terminals, local convergence cabinets, etc.) that are situated in service areas having a high concentration of subscribers. Such FTTC systems provide certain of the benefits of an all fiber optic network, but still require the deployment of a continuous fiber optic network from the service provider's transceiving and/or switching equipment to the subscriber's transceiving equipment in order to realize the full benefit of the fiber optic network.

It is known that fiber optic drop cables may be efficiently connectorized in a controlled manufacturing environment, such as an optical cable assembly plant, thereby avoiding the higher material, labor and equipment costs required to connectorize drop cables in the field. By pre-connectorizing the fiber optic drop cable, the necessity of field splicing an optical fiber of the drop cable to, for example, an optical fiber of a distribution cable, is avoided. However, the pre-connectorized drop cable must be manufactured in either custom or preselected standard lengths, the former being impractical due to the higher manufacturing costs so that the latter is a preferred solution in most instances. A problem which then exists is where and how to store the excess length of drop cable that results when deploying, for example, a standard 108-foot drop cable when the length of the drop cable actually needed is only 175 feet. Service providers have long desired to deploy pre-connectorized drop cables in order to reduce field labor and installation costs, but thus far have not been presented with an effective manner in which to store the excess length of the drop cable (also referred to herein as drop cable slack).

Therefore, what is needed is an apparatus for storing the fiber optic drop cable slack that results when deploying a pre-connectorized drop cable to a subscriber premises. Further, what is needed is an apparatus that both stores drop cable slack and substantially conceals it from view, such as a slack storage receptacle that is mounted to a wall surface of a subscriber premises, is buried in the ground, or is mounted in close proximity to a connection terminal, such as an aerial closure or an above-ground telecommunications pedestal.

BRIEF SUMMARY OF THE INVENTION

To achieve the foregoing and other objects, and in accordance with the purposes of the invention as embodied and broadly described herein, the present invention provides various embodiments of a fiber optic drop cable slack storage receptacle for storing and protecting an excess length of a fiber optic drop cable deployed in an optical communications network. In particular, the present invention provides various embodiments of a fiber optic drop cable storage receptacle for storing and protecting the excess length of a pre-connectorized fiber optic drop cable deployed between a connection terminal and a subscriber network interface device (NID) in an optical communications network. The slack storage receptacle described herein substantially reduces the additional cost of manufacturing, shipping and deploying custom lengths of pre-connectorized fiber optic drop cables to a subscriber premises. Further, the slack storage receptacle described herein allows a field technician to install a pre-connectorized fiber optic drop cable at a subscriber premises and to store the drop cable slack, while providing protection to the drop cable from adverse environmental conditions.

To facilitate the deployment of optical fiber to the subscriber premises, the slack storage receptacle of the present invention is operable for storing the excess length of fiber optic drop cable that extends between a network connection terminal and the subscriber premises. In one exemplary embodiment, the present invention is a slack storage receptacle that facilitates the deployment and installation of optical fiber to a NID mounted on the exterior wall of the subscriber premises. The slack storage receptacle includes a housing and a drawer that is adapted to cooperate in sliding engagement with the housing. To facilitate long-term, trouble free service, the slack storage receptacle is configured so as to not interfere with the operational functions of the NID, and is further configured to store fiber optic drop cable slack while maintaining the minimum bend radius of the drop cable. The housing includes a substantially planar rear panel having at least one recessed mounting port for receiving a fastener to secure the housing to the exterior wall of the subscriber premises, a top wall and a bottom wall. The top and bottom walls each have a lip extending therefrom and projecting inwardly towards the opposite wall. Further, at least one of the top and bottom walls of the housing has a plurality of biased locking pins for securing the drawer in an opened configuration and a closed configuration relative to the housing. Preferably, the pins are laterally offset and located at opposing ends of the wall to which they are affixed. Extending from the top and bottom walls of the first housing are mounting brackets for mounting the NID or a cover plate onto the housing.

The drawer includes a substantially planar rear wall, a top wall, a bottom wall and opposed side walls, which together define an interior cavity for retaining the drop cable slack. Extending from each wall is a lip that projects inwardly towards the interior cavity of the drawer. The rear wall of the drawer has at least one aperture disposed therein that is coincident with the at least one mounting port with the drawer in the closed configuration to permit a field technician to access the fastener within the mounting port. A respective one of the top wall and the bottom wall of the drawer has a corresponding plurality of openings therethrough, one of which is coincident with a corresponding pin of the housing in the opened configuration and the closed configuration. The respective top or bottom wall is further provided with guiding tabs at the opposed ends thereof for permitting the drawer to travel past the corresponding pin while being moved from the opened configuration to the closed configuration. When the drawer is slidably engaged with the housing, at least one, and preferably only one, of the pins of the housing engages the corresponding opening in the drawer to secure the receptacle in the closed configuration. When the drawer is in the opened configuration, a field technician can easily arrange one or more coils of the drop cable slack therein so that the outward bias of the drop cable coils presses the drop cable slack against the top wall, the bottom wall and the side walls of the drawer, thereby retaining the drop cable slack within the drawer of the slack storage receptacle, while maintaining a minimum bend radius of the fiber optic drop cable.

The slack storage receptacle may be secured to the exterior wall of a subscriber premises with or without the NID mounted thereon, or may be secured in the vicinity of a connection terminal of the optical network at a location remote from the NID. For example, but without limitation, the slack storage receptacle may be secured at an aerial location in the vicinity of an aerial closure, at an above-ground location in the vicinity of a telecommunications pedestal, or at a buried location in the vicinity of a below grade closure. Regardless, the drop cable slack is stored external to the NID in a concealed manner to discourage unauthorized access and to protect the drop cable slack from inadvertent damage or direct exposure to adverse environmental conditions.

In an alternative embodiment of the present invention, the slack storage receptacle consists of a generally rectangular housing including a rear panel, a top wall, a bottom wall and opposed side walls, which together generally form an open box-like structure defining an interior cavity for storing one or more coils of drop cable slack. At least one, and preferably both, side walls of the housing include at least one cable opening located medially between the opposed ends of the side wall. At least one routing guide is provided along the outer surface of the side wall for routing a fiber optic drop cable to and from the respective cable opening. At least one mounting feature for mounting the NID to the slack storage receptacle is provided on the housing, and preferably, a mounting feature is provided at each of the lower corners of the storage receptacle adjacent the side walls and the bottom wall. Located medially between the opposed ends of the top wall is a hinge assembly adapted to receive the NID such that the NID is hingedly affixed to the housing. Alternatively, a cover plate may be mounted onto the housing in place of the NID. Affixed to the rear panel and projecting outwardly is an inner hub having a plurality of radially outwardly extending retaining flanges. Preferably, the interior area of the inner hub is provided with a plurality of stiffening ribs to strengthen and prevent distortion of the rear panel and the inner hub during shipping, deployment and/or service. Disposed within the interior area of the inner hub is at least one, and preferably, a plurality of mounting ports for securing the housing to, for example, an exterior wall of a subscriber premises. The rear panel is also provided with an outer hub spaced laterally from and substantially surrounding the inner hub to form a cable channel in which the drop cable slack is retained. The outer hub may be provided with a plurality of radially inwardly extending retaining flanges to permit a field technician to easily position coils of the drop cable slack within the cable channel. The slack storage receptacle may be secured to the exterior wall of a subscriber premises with or without the NID mounted thereon, or may be secured in the vicinity of a connection terminal of the optical network at a location remote from the NID. For example, but without limitation, the slack storage receptacle may be secured at an aerial location in the vicinity of an aerial closure, at an above-ground location in the vicinity of a telecommunications pedestal, or at a buried location in the vicinity of a below grade closure. Regardless, the drop cable slack is stored external to the NID in a concealed manner to discourage unauthorized access, and to protect the drop cable slack from inadvertent damage or direct exposure to adverse environmental conditions.

In still another alternative embodiment of the present invention, the slack storage receptacle consists of a housing having a generally oval-shaped configuration, a top cover and a bottom cover. The housing consists of an oval-shaped rear panel and a side wall defining an annular cable channel for storing one or more coils of drop cable slack. The cable channel is configured so as to have a radius of curvature that exceeds the minimum bend radius of the drop cable and extends beyond the outer periphery of a conventional sized NID. The rear panel comprises a generally planar back wall and the side wall extends outwardly from the back wall continuously along the outer perimeter of the back wall. The back wall is provided with a first mounting means (not shown) adapted to secure the housing to, for example, an exterior wall of a subscriber premises, and a second mounting means (not shown) adapted to secure the NID to the housing. Preferably, the side wall is provided with a plurality of circumferentially spaced retaining flanges that are affixed to the interior surface of the side wall for retaining the coiled drop cable slack within the cable channel. Together, the side wall and plurality of retaining flanges form the cable channel for storing the drop cable slack within the housing. At least one, and preferably, more than one cable transition opening is provided through the side wall at a predetermined location for transitioning the drop cable slack into or out of the housing. A plurality of projecting studs are located peripherally along the exterior surface of the side wall for engaging retaining mechanisms provided on the top cover and the bottom cover to securely retain the top and bottom covers on the housing, and thereby form an enclosed assembly around the NID. The top cover and the bottom cover each include a partial front wall that overlies the rear panel of the housing and an outer wall that is sized so as to overlap and engage the side wall of the housing. The outer wall has at least one, and preferably, more than one opening or recess therethrough that defines a cable transition duct for transitioning the drop cable into the top cover and out of the bottom cover. Each cable transition duct is coincident with a corresponding cable transition opening provided on the side wall of the housing when the top cover and the bottom cover are assembled on the housing to allow the drop cable to enter and exit the slack storage receptacle. The top cover and the bottom cover are each provided with at least one retaining mechanism, such as an elongate slot and a latch, respectively, to securely retain the top cover and the bottom cover together on the housing in the fully assembled configuration previously described. A cutaway portion centrally disposed in each of the front walls of the top cover and the bottom cover is shaped to conform to the shape of the outer contour of the NID. Thus, the top cover and the bottom cover are adapted to cooperate with each other to conform to the contour of the outer periphery of the NID when the latch provided on the bottom cover engages the slot provided on the top cover. The slack storage receptacle may be secured to the exterior wall of a subscriber premises with or without the NID mounted thereon, or may be secured in the vicinity of a connection terminal of the optical network at a location remote from the NID. For example, but without limitation, the slack storage receptacle may be secured at an aerial location in the vicinity of an aerial closure, at an above-ground location in the vicinity of a telecommunications pedestal, or at a buried location in the vicinity of a below grade closure. Regardless, the drop cable slack is stored external to the NID in a concealed manner to discourage unauthorized access, and to protect the drop cable slack from inadvertent damage or direct exposure to adverse environmental conditions.

In still another alternative embodiment, the slack storage receptacle consists of a generally box-shaped housing, a cover and a storage means disposed within the housing for storing one or more coils of drop cable slack. The housing includes a rear panel, a top wall, a bottom wall and two opposed side walls, which together define an interior cavity. The storage means is approximately centrally disposed within the interior cavity defined by the housing and preferably comprises a hub extending upwardly from the interior surface of the rear panel and a reel rotatably mounted on the hub for storing the drop cable slack. The reel includes an inner wall adjacent the hub and an outer wall spaced outward radially from the inner wall that defines a generally cylindrical surface for receiving the drop cable slack. The reel further includes at least two spaced apart outer flanges for retaining the drop cable slack on the outer wall. The reel may also include a bend radius guide disposed on the outer wall for reversing the direction in which the drop cable slack is wound onto or paid off the reel. Alternatively, the reel may include a radially extending medial flange disposed on the outer wall between the outer flanges to thereby define a first storage location for storing a first length of the drop cable slack and a second storage location for storing a second length of the drop cable slack. Preferably, the medial flange has a radial slot formed therein for permitting the drop cable slack to transition between the first storage location and the second storage location. The entire length of the fiber optic drop cable may be stored on the reel such that the slack storage receptacle is advantageously useable as a shipping container and a deployment device. The fiber optic drop cable is wound onto the reel, the reel is positioned on the hub and disposed within the housing, and the cover is secured to the housing to seal the slack storage receptacle against adverse environmental conditions encountered during shipping. The fiber optic drop cable is then deployed into the optical communications network between, for example, a network connection terminal and a NID located at a subscriber premises with the drop cable slack stored within the slack storage receptacle. The slack storage receptacle may be secured to the exterior wall of a subscriber premises with or without the NID mounted thereon, or may be secured in the vicinity of a connection terminal of the optical network at a location remote from the NID. For example, but without limitation, the slack storage receptacle may be secured at an aerial location in the vicinity of an aerial closure or at an above-ground location in the vicinity of a telecommunications pedestal, or may be secured at a buried location in the vicinity of a below grade closure. Preferably, however, the slack storage receptacle of this embodiment is buried at a convenient location between the connection terminal and the NID, and most preferably, is buried immediately adjacent the subscriber premises. Regardless, the drop cable slack is stored external to the NID in a concealed manner to discourage unauthorized access, and to protect the drop cable slack from inadvertent damage or direct exposure to adverse environmental conditions.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
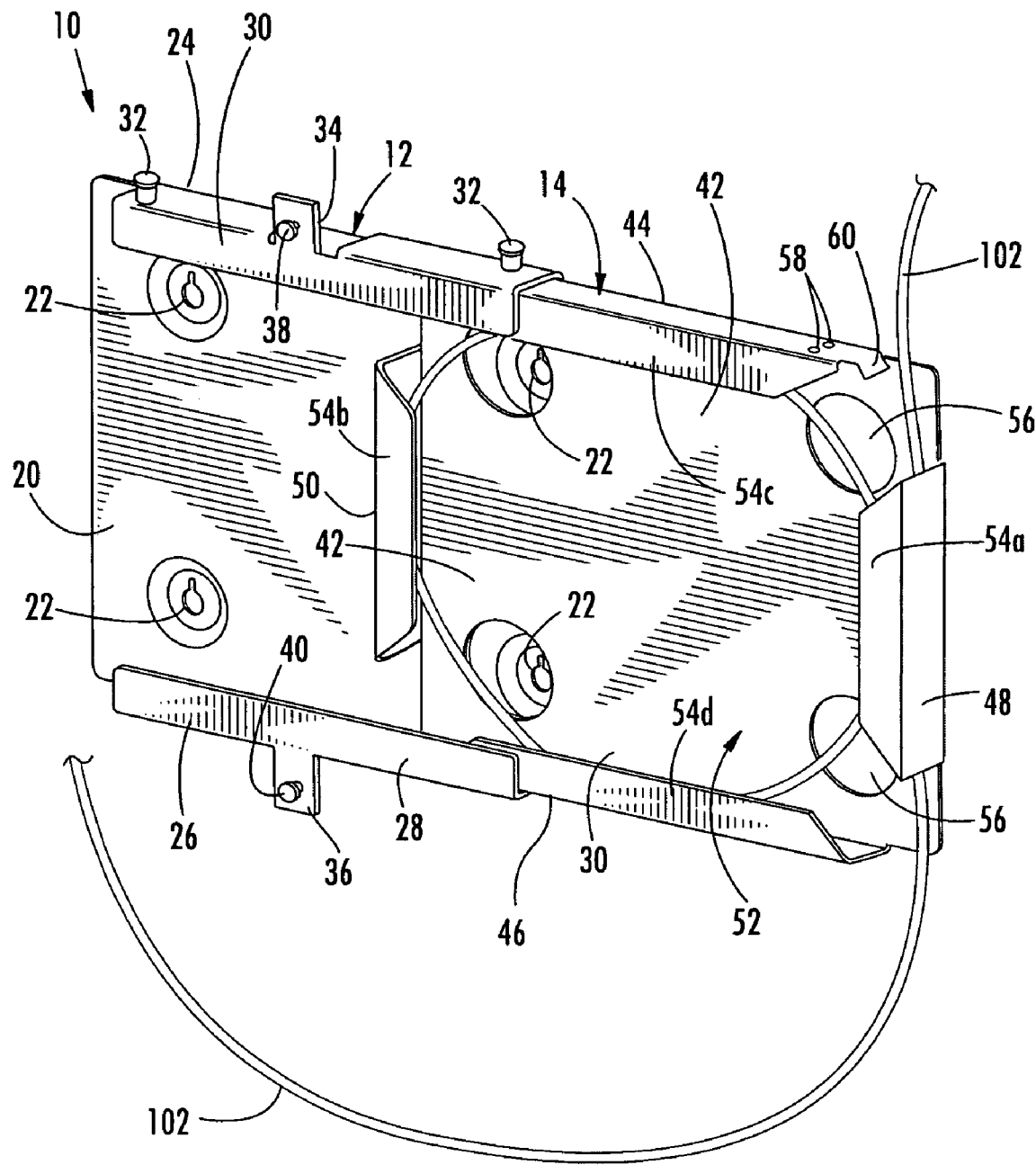
FIG. 1 is a perspective view of a fiber optic drop cable slack storage receptacle for storing an excess length of a pre-connectorized fiber optic drop cable in an optical communications network in accordance with an exemplary embodiment of the present invention.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

The present invention provides a fiber optic drop cable slack storage receptacle for storing and protecting an excess length of a pre-connectorized fiber optic drop cable in an optical communications network. As is well known and understood in the art, a connectorized fiber optic drop cable comprises a hollow cable sheath or jacket housing at least one flexible transport tube containing one or more optical fibers. In one example, a fiber optic drop cable may be used to optically connect a network interface device (NID) located at a subscriber premises to a connectorized fiber optic distribution cable at a connection terminal, such as an aerial closure, an above-ground telecommunications pedestal or a buried closure. In serving the foregoing function, the present invention facilitates the deployment of a "fiber to the premises" (FTTP) optical communications network.

In facilitating the deployment of a FTTP network, the present invention functions to permit preselected, standard lengths of pre-connectorized fiber optic drop cables to be utilized within the network with any excess length of the fiber optic drop cable (also referred to herein as drop cable slack) stored within the slack storage receptacle external to the NID and in a concealed manner to thereby discourage unauthorized access, and to protect the drop cable slack from inadvertent damage or direct exposure to adverse environmental conditions. As is well known and understood in the art, a FTTP network generally comprises a fiber optic distribution cable, one or more optical connection terminals, such as a local convergence cabinet, a network access point closure or a telecommunications pedestal, at least one optical NID located at a subscriber premises and a pre-connectorized fiber optic drop cable that extends between a connection terminal and the NID. Generally, the present invention provides an apparatus for storing and protecting the drop cable slack that typically results when a preselected standard length of pre-connectorized fiber optic drop cable is deployed between an optical connection terminal and an optical NID. Further, the present invention provides a cost effective manner of deploying a pre-connectorized fiber optic drop cable at a subscriber premises prior to the installation of the NID or prior to connection of the NID to a connection terminal.

By way of example only, and not by way of limitation, the slack storage receptacle of the present invention will hereinafter be described as a wall-mounted receptacle. However, it will be understood by those skilled in the art that the slack storage receptacle may also be employed in an aerial, above-ground or buried installation. As such, the slack storage receptacle may be provided with hangers (not shown) for suspending the storage receptacle from an aerial cable strand and/or brackets or straps for securing the slack storage receptacle to a telephone pole or to a buried or above-ground connection terminal, or to any other convenient structure in the vicinity of an aerial, above-ground or buried connection terminal.

Figure 2:
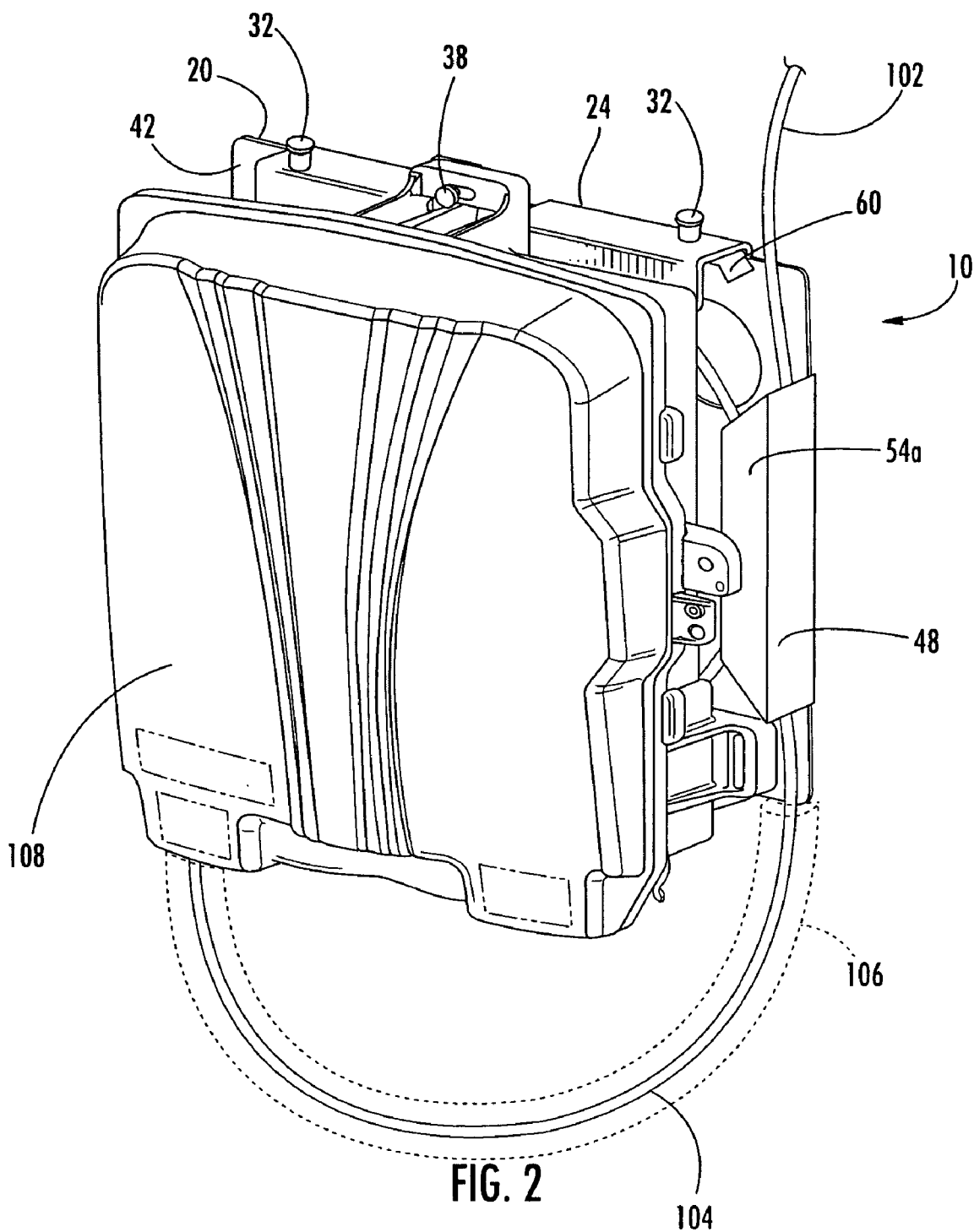
FIG. 2 is a perspective view of the slack storage receptacle of FIG. 1 shown in the closed configuration and with a conventional NID mounted thereon.

Referring now to the drawings, FIGS. 1 and 2 show a slack storage receptacle, indicated generally at 10, constructed in accordance with an exemplary embodiment of the present invention. The slack storage receptacle 10 is relatively thin and made of a lightweight, yet rigid material such as aluminum, plastic, thermoplastic or composite that is configured to be mounted adjacent to, and preferably behind, a conventional NID 108 (FIG. 2), such as the SABRE® NID available from Corning Cable Systems LLC of Hickory, N.C., shown herein. The slack storage receptacle 10 may have a variety of shapes that are suitable for storing and protecting drop cable slack, but is preferably generally rectangular in configuration, as shown. Preferably, the slack storage receptacle 10 has a depth dimension that is substantially less than either of its lengthwise or widthwise dimensions. The slack storage receptacle 10 comprises a housing 12 and a drawer 14 that is adapted to cooperate in sliding engagement with the housing 12 for movement between an opened configuration and a closed configuration.

To facilitate long-term trouble free service and so as to not interfere with the functions of the NID 108, the slack storage receptacle 10 stores and protects an excess length of a pre-connectorized fiber optic drop cable 102 external to the NID 108 without violating the minimum bend radius of the drop cable 102. This is desirable since bending a fiber optic cable to less than its minimum bend radius may damage the optical fibers and/or impair the optical transmission characteristics of the cable. Typically, the minimum bend radius of the fiber optic drop cable 102 is at least about 1.5 inches.

The housing 12 comprises a substantially planar rear panel 20 that includes at least one, and as shown, four recessed mounting ports 22 for receiving a fastener (not shown) to secure the housing 12 to an exterior wall of the subscriber premises, a top wall 24 and a bottom wall 26. The top wall 24 and the bottom wall 26 of the housing 12 each have a lip, 28 and 30 respectively, extending therefrom and projecting inwardly towards the opposite wall 26 or 24. Further, at least one of the top wall 24 and the bottom wall 26 has a plurality of biased locking pins 32 for securing the drawer 14 in an opened configuration or a closed configuration. The locking pins 32 are biased inwardly in the direction of the drawer 14 in any suitable manner, for example, by a coil spring retained within a closed cylinder between the outer surface of the top wall 24 and the inner surface of the cylinder. As a result, the slack storage receptacle 10 may be mounted on the exterior wall of the subscriber premises in any orientation and the locking pins 32 will still secure the drawer 14 within the housing 12. Preferably, however, the slack storage receptacle 10 is mounted on the exterior wall of the subscriber premises such that the locking pins 32 are lifted vertically upwards against the biasing force to permit the drawer 14 to slide relative to the housing 14. Furthermore, the locking pins 32 are offset laterally and located at opposing ends of the wall 24, 26 to which they are affixed. Thus, as will be described, the drawer 14 is adapted to slide relative to the housing 12 in either horizontal direction (i.e., to the left or as shown to the right) between the top wall 24 and the bottom wall 26.

Extending upwardly from the top wall 24 and downwardly from the bottom wall 26 of the housing 12 are mounting brackets 34, 36, respectively, provided for mounting the NID 108 or a cover plate (not shown) onto the slack storage receptacle 10. The mounting brackets 34, 36 extend in the opposite directions of the lips 28, 30, respectively. The mounting brackets 34, 36 may employ any suitable fastening mechanism for mounting the NID 108 onto the slack storage receptacle 10, such as conventional threaded screws 38, 40.

The drawer 14 comprises a substantially planar rear wall 42, a top wall 44, a bottom wall 46 and opposed side walls 48 and 50. Together, the rear wall 42, the top wall 44, the bottom wall 46 and the side walls 48, 50 of the drawer 14 define an interior cavity 52 for receiving and storing the excess length of the fiber optic drop cable 102 that typically results when a drop cable is deployed in an optical communications network between an outside plant connection terminal (not shown) and the NID 108. Extending from each of the side walls 48, 50, the top wall 44 and the bottom wall 46 is a respective lip 54a, 54b, 54c, 54d that projects inwardly towards the interior cavity 52 defined by the drawer 14. The rear wall 42 of the drawer 14 has at least one substantially circular aperture 56 disposed therein. The at least one aperture 56 is coincident with the at least one mounting port 22 of the rear panel 20 of the housing 12 when the drawer 14 is in the closed configuration to thereby permit a filed technician to access the fastener within the mounting port 22 that secures the housing 12 to the exterior wall of the subscriber premises. A respective one of the top wall 44 and the bottom wall 46 of the drawer 14 has a plurality of openings 58 therethrough that cooperate with the locking pins 32 of the housing 12 in the closed configuration and the opened configuration. In particular, one of the openings 58 is coincident with one of the locking pins 32 in each of the closed and opened configurations.

As illustrated in FIG. 1, the openings 58 comprise a pair of openings located adjacent the right-hand end of the top wall 44 of the drawer 12 and a single opening (hidden in FIG. 1) located adjacent the left-hand end of the top wall 44 of the drawer 14. As such, the right-hand locking pin 32 of the housing 12 engages the rearward one of the right-hand openings 58 in the closed configuration and, as shown, engages the left-hand opening 58 in the opened configuration when the drawer 14 is slid horizontally to the right relative to the housing 12. The left-hand locking pin 32 of the housing 12 engages the forward one of the right-hand openings 58 in the opened configuration when the drawer 14 is slid horizontally to the left relative to the housing 12 (opposite to the opened configuration shown). Advantageously, only one of the locking pins 32 engages one of the openings 58 in the closed configuration and the opened configuration. As a result, a field technician can easily move the drawer 14 between the closed configuration and either opened configuration by releasing only one of the locking pins 32. The respective top wall 44 or bottom wall 46 is further provided with angled guiding tabs 60 at the opposed ends thereof for permitting the drawer 14 to travel past the corresponding locking pin 32 while being moved from either of the opened configurations to the closed configuration. In particular, the guiding tab 60 engages the lower end of the corresponding locking pin 32 and forces it upwardly against the biasing force and onto the outer surface of the top wall 44 of the drawer 14 so that the drawer 14 can slide relative to the housing 12 until the right-hand locking pin 32 engages the rearward one of the right-hand openings 58 in the closed configuration. When the drawer 14 is positioned in either of the opened configurations, a field technician can easily arrange one or more coils of the drop cable 102 within the interior cavity 52 so that the naturally occurring outward bias of the drop cable coils presses the drop cable 102 against the interior surfaces of the top wall 44, the bottom wall 46 and the opposed side walls 48, 50 of the drawer 14. Thus, the drop cable slack is retained within the drawer 14 of the slack storage receptacle 10, while maintaining the minimum bend radius of the fiber optic drop cable 102. The drawer 14 may then be slid relative to the housing 12 and positioned in the closed configuration to securely store and protect the drop cable slack within the slack storage receptacle 10.

The slack storage receptacle 10 is adapted to store the drop cable slack externally to the NID 108 at any suitable location between the NID 108 and an outside plant optical connection terminal, for example, an aerial, above-ground or below grade closure. Preferably, the slack storage receptacle 10 is secured to an exterior wall of a subscriber premises utilizing at least one of the mounting ports 22 and respective conventional fasteners, and the NID 108 is mounted onto the slack storage receptacle 10 utilizing at least one of the mounting brackets 34, 36 and the respective threaded screw 38, 40. However, the slack storage receptacle 10 may instead be secured in the vicinity of an outside plant connection terminal (not shown) of the optical network at a location remote from the NID 108. For example, but without limitation, the slack storage receptacle 10 may be secured at an aerial location in the vicinity of an aerial closure, at an above-ground location in the vicinity of a telecommunications pedestal, or at a buried location in the vicinity of a below grade closure. Regardless, the drop cable slack is stored external to the NID 108 in a concealed manner to discourage unauthorized access and to protect the drop cable slack from inadvertent damage or direct exposure to adverse environmental conditions.

In an exemplary method, the slack storage receptacle 10 is first mounted to an exterior wall of a subscriber premises utilizing at least one of the mounting ports 22 and respective conventional fasteners. The NID 108 is next mounted onto the housing 12 of the slack storage receptacle 10 utilizing at least one of the mounting brackets 34, 36 and the respective threaded screw 38, 40. The pre-connectorized fiber optic drop cable 102 is connected to and routed from an outside plant connection terminal to the NID 108. The drawer 14 of the slack storage receptacle 10 is then moved from the closed configuration to the opened configuration in the manner previously described. Any excess length of the drop cable 102 is then inserted into the interior cavity 52 of the drawer 14 and coiled between the top wall 44, the bottom wall 46 and the opposed side walls 48, 50 in the manner illustrated in FIG. 1. The drop cable slack is inserted and coiled beginning with the portion of the drop cable 102 closest to the connection terminal and enough of the free end of the drop cable 102 is left outside the drawer 14 to form a drip loop 104 (FIG. 2) between the slack storage receptacle 10 and the NID 108. Finally, the drawer 14 is then moved from the opened configuration to the closed configuration in the manner previously described and the free end of the drop cable 102 is connected to the NID 108. An elongate, flexible shield 106, indicated generally by the broken lines in FIG. 2, may be positioned over the drip loop 104 for purposes of aesthetics and/or safety. The shield 106 may be made of a thin metal, plastic, thermoplastic or composite material and may be formed as a smooth or corrugated tube having an inner diameter greater than the outer diameter of the fiber optic drop cable 108. Alternatively, the shield 106 may be formed as a pre-molded semi-circular cover secured at each end to the slack storage receptacle 10 and the NID 108. If the NID 108 is not present or is not ready to be connected, the free end of the drop cable 102 may be stored within the storage receptacle 10 until needed to protect the drop cable 102 from inadvertent damage or direct exposure to adverse environmental conditions. Thus, it is possible to pre-install the drop cable 102 for later use, or if the NID 108 is removed, to store and protect the drop cable 102 within the slack storage receptacle 10 until the NID 108 is re-installed. If the NID 108 is not present, an optional cover plate (not shown) may be secured in its place over the housing 12 of the slack storage receptacle 10.

Figure 3:
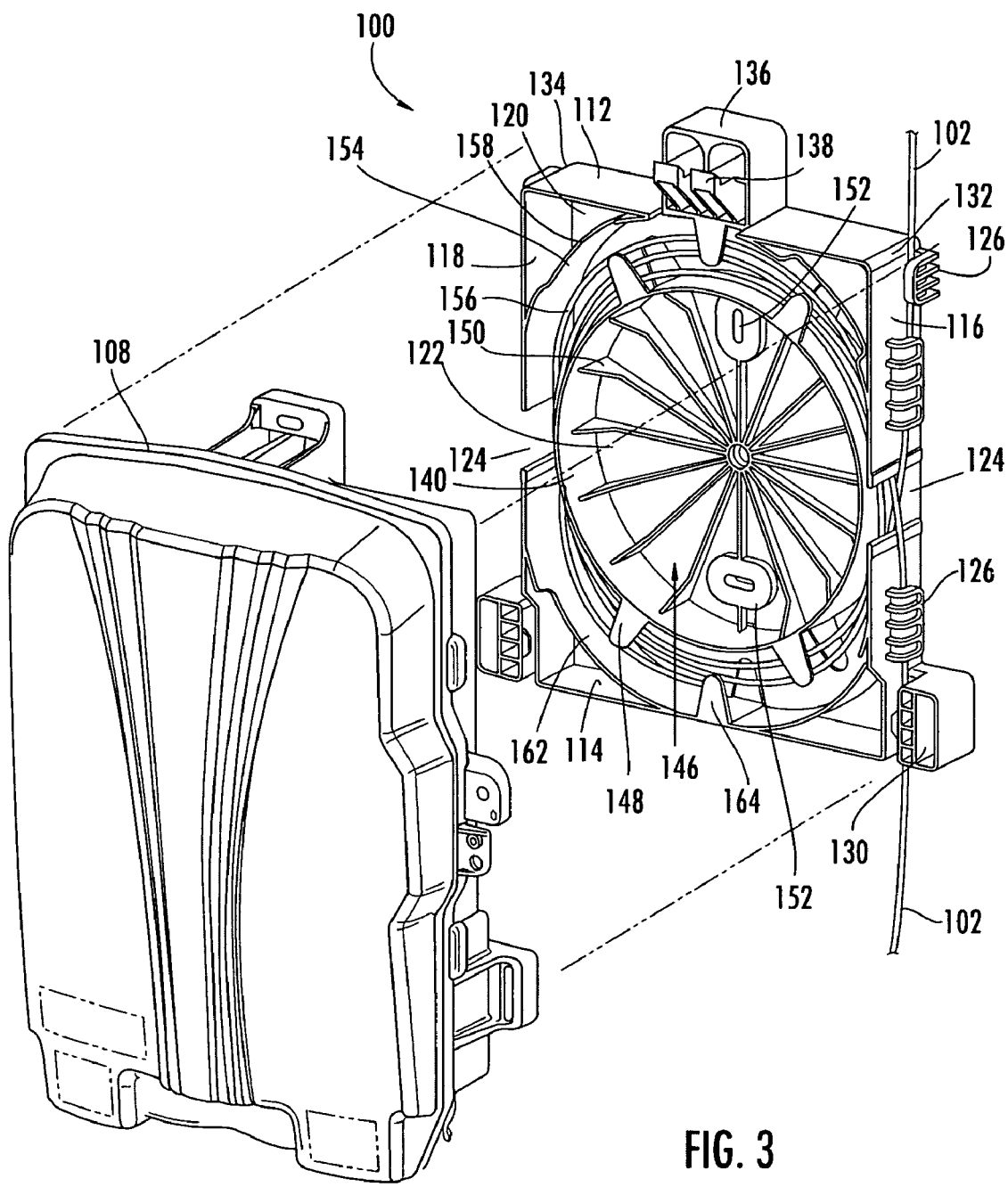
FIG. 3 is a perspective view of a fiber optic drop cable slack storage receptacle for storing an excess length of a pre-connectorized fiber optic drop cable in an optical communications network in accordance with an alternative embodiment of the present invention.
Figure 4:
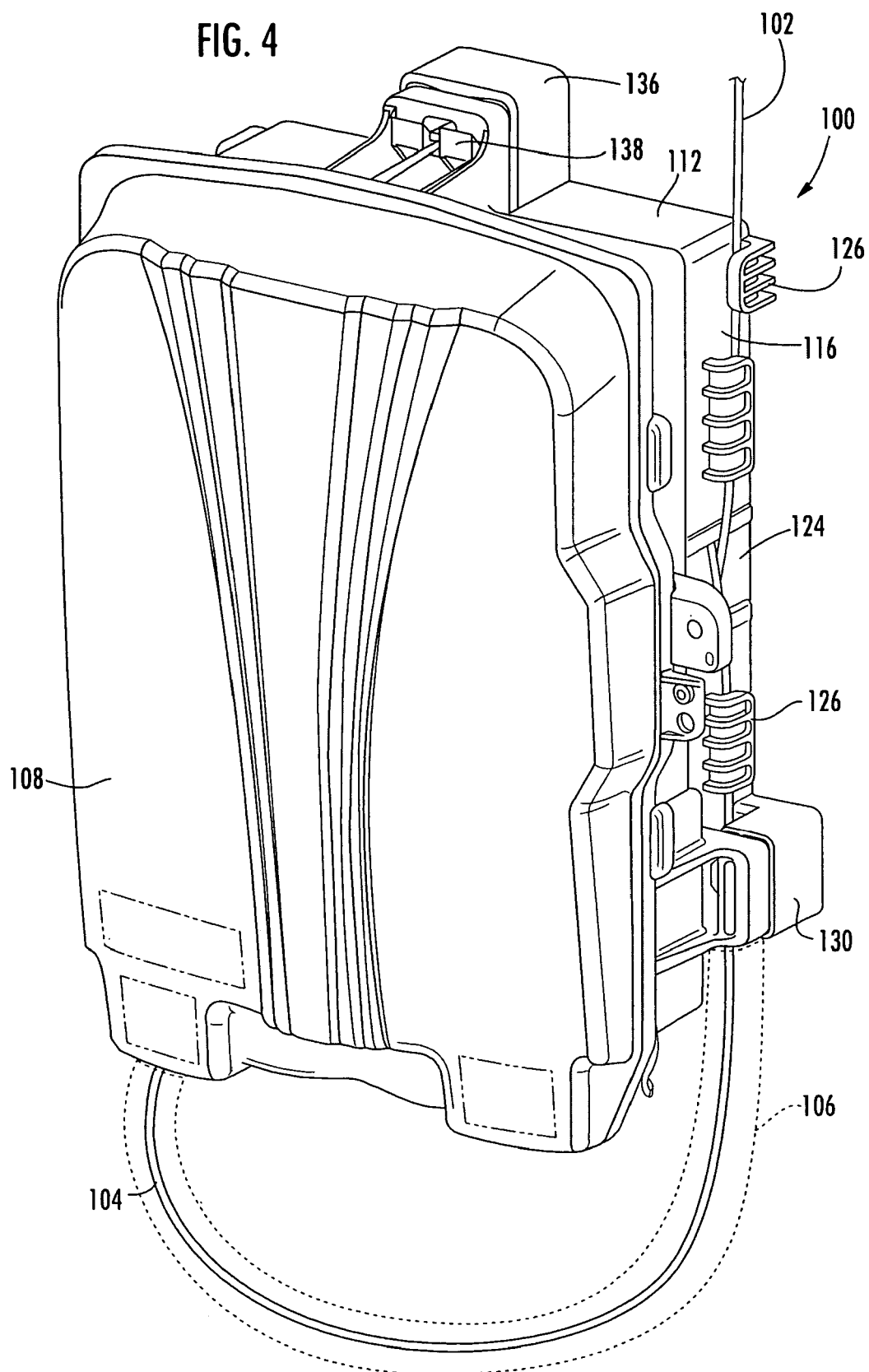
FIG. 4 is a perspective view of the slack storage receptacle of FIG. 3 shown in the assembled configuration and with a conventional NID mounted thereon.

FIGS. 3 and 4 show an alternative embodiment of a slack storage receptacle 100 constructed in accordance with the present invention. The slack storage receptacle 100 consists of a generally rectangular housing comprising a top wall 112, a bottom wall 114, opposed side walls 116 and 118, and a rear panel 120. Together, the top wall 112, the bottom wall 114, the side walls 116, 118 and the rear panel 120 generally form an open box-like structure defining an interior cavity 122 for storing one or more coils of excess length of a pre-connectorized fiber optic drop cable 102. The slack storage receptacle 100 is relatively thin and made of a lightweight, yet rigid material such as aluminum, plastic, thermoplastic or composite that is configured to be mounted adjacent to, and preferably behind, a conventional NID 108, such as the SABRE® NID available from Corning Cable Systems LLC of Hickory, N.C., shown herein. The slack storage receptacle 100 may have a variety of shapes that are suitable for storing and protecting drop cable slack, but is preferably generally rectangular in configuration, as shown. Preferably, the slack storage receptacle 100 has a depth dimension that is substantially less than either of its lengthwise or widthwise dimensions.

At least one, and preferably both, of the side walls 116 and 118 include at least one cable entrance and exit opening 124 located medially between the opposed ends of the respective side wall 116, 118. The opening 124 may be so designed with radiused surfaces and or guides (not shown) so as to prevent possible bending or kinking that may damage the drop cable 102. As shown, at least one routing guide 126 is provided along the outer surface of the side wall 116 for guiding the drop cable 102 into and away from the cable opening 124. While the illustrated embodiment shows at least one routing guide 126, it will be appreciated by those skilled in the art that other known guiding devices may be used to route the drop cable 102 to and from the opening 124, including, but not limited to, flanges, tabs, loops and cable ties. At least one mounting feature 130 for mounting the NID 108 onto the slack storage receptacle 100 is provided on the housing. Preferably, a mounting feature 130 is provided on each of the lower corners of the housing adjacent the respective side wall 116, 118 and the bottom wall 114. The mounting feature 130 may be any conventional type of mount for securing the NID 108 to the slack storage receptacle 100, including, but not limited to, clasps, snap joints, screws and locking pins. Located medially between the opposed ends 132 and 134 of the top wall 112 is a hinge assembly 136 adapted to receive the NID 108 such that the NID 108 is hingedly affixed to the housing. As shown, the hinge assembly 136 comprises at least one hanger 138 for hingedly engaging the NID 108. Alternatively, a cover plate (not shown) may be mounted onto the housing over the interior cavity 122 in place of the NID 108. The mounting features 130 and the hinge assembly 136 permit a field technician to removably position the NID 108 over the interior cavity 122 of the slack storage receptacle 100 to temporarily store, protect and conceal the excess length of the fiber optic drop cable 102, as will be described hereinafter. In particular, the hinge assembly 136 permits the NID 108 to hang freely from the slack storage receptacle 100 and to be rotated upwardly relative to the slack storage receptacle 100 to expose the interior cavity 122. As best shown in FIG. 3, the hinge assembly 136 is disposed centrally on the top wall 112. However, it will be readily appreciated by those skilled in the art that the hinge location 136 may be located anywhere along the top wall 112. Furthermore, the mounting features 130 could be provided on each of the upper corners of the housing adjacent the respective side wall 116, 118 and the top wall 112, and the hinge assembly 136 could be inverted and disposed along the bottom wall 114.

Affixed to the rear panel 120 and centrally disposed thereon is an inner hub 140. The inner hub 140 projects outwardly from the rear panel 120 and has a plurality of radially outwardly extending retaining flanges 148 that are circumferentially spaced around the inner hub 140. The interior area 146 of the inner hub 140 preferably comprises a plurality of radially disposed stiffening ribs 150 to strengthen and prevent distortion of the rear panel 120 and the inner hub 140 caused, for example, extreme temperature fluctuations that may occur during, shipping, deployment or service. Disposed within the interior area 146 of the inner hub 140 is at least one, and preferably, a plurality of mounting ports 152 for securing the housing to an exterior wall of the subscriber premises. As shown, the mounting ports 152 comprise a pair of elongated slots oriented generally perpendicular to one another for receiving a conventional fastener, such as a threaded screw or bolt, a wing nut, clasp, clip, or hanger. The rear panel 120 is also provided with an outer hub 154 spaced laterally (i.e., radially outwardly) from the inner hub 140 such that the outer hub 154 substantially surrounds the inner hub 140 to form a cable channel 156 in which the drop cable slack is retained. The cable channel 156 is dimensioned to have a minimum radius of curvature equal to or greater than the minimum bend radius of the drop cable 102. As shown, an upper portion 158 and a lower portion 162 of the outer hub 154 extend continuously between the cable entrance and exit openings 124 provided on the opposed side walls 116, 118. The outer hub 154 may be provided with a plurality of retaining flanges 164 that extend radially inwardly into the cable channel 156 to permit a filed technician to easily position coils of the drop cable slack within the cable channel 156. Preferably, the plurality of retaining flanges 148 are equally spaced apart and the plurality of retaining flanges 164 are likewise equally spaced apart. However, it will be readily appreciated by those skilled in the art that any manner of spacing may be employed.

As previously described with reference to the embodiment shown in FIGS. 1 and 2, the alternative embodiment of the slack storage receptacle 100 shown in FIGS. 3 and 4 is adapted to store the drop cable slack externally to the NID 108 at any suitable location between the NID 108 and an outside plant optical connection terminal, for example, an aerial, above-ground or below grade closure. Preferably, the slack storage receptacle 100 is secured to an exterior wall of a subscriber premises utilizing at least one of the mounting ports 152 and respective conventional fasteners, and the NID 108 is mounted onto the slack storage receptacle 100 utilizing the hinge assembly 136 and at least one of the mounting features 130 and respective conventional fasteners. However, the slack storage receptacle 100 may be mounted on the exterior wall of the subscriber premises with or without the NID 108 mounted thereon. Furthermore, the slack storage receptacle 100 may instead be secured in the vicinity of an outside plant connection terminal (not shown) of the optical network at a location remote from the NID 108. For example, but without limitation, the slack storage receptacle 100 may be secured at an aerial location in the vicinity of an aerial closure, at an above-ground location in the vicinity of a telecommunications pedestal, or at a buried location in the vicinity of a below grade closure. Regardless, the drop cable slack is stored external to the NID 108 in a concealed manner to discourage unauthorized access and to protect the drop cable slack from inadvertent damage or direct exposure to adverse environmental conditions.

In an exemplary method, the slack storage receptacle 100 is first mounted to an exterior wall of a subscriber premises utilizing at least one of the mounting ports 152 and respective conventional fasteners. The pre-connectorized fiber optic drop cable 102 is next connected to and routed from an outside plant connection terminal to the NID 108. The drop cable 102 is then guided along the outer surface of the appropriate side wall 116, 118 utilizing one or more of the routing guides 126 and any excess length of the drop cable 102 is inserted into the cable channel 156 through the corresponding cable entrance and exit opening 124. The drop cable slack is then coiled between the inner hub 140 and the outer hub 154 in the manner illustrated in FIG. 3. The drop cable slack is inserted and coiled beginning with the portion of the drop cable 102 closest to the connection terminal and enough of the free end of the drop cable 102 is left outside the housing to form a drip loop 104 (FIG. 4) between the slack storage receptacle 100 and the NID 108. Finally, the NID 108 is mounted onto the slack storage receptacle 100 utilizing the hinge assembly 136 and at least one of the mounting features 130 and respective conventional fasteners, and the free end of the drop cable 102 is connected to the NID 108. An elongate, flexible shield 106, indicated generally by the broken lines in FIG. 4, may be positioned over the drip loop 104 for purposes of aesthetics and/or safety. The shield 106 may be made of a thin metal, plastic, thermoplastic or composite material and may be formed as a smooth or corrugated tube having an inner diameter greater than the outer diameter of the fiber optic drop cable 108. Alternatively, the shield 106 may be formed as a pre-molded semi-circular cover secured at each end to the slack storage receptacle 100 and the NID 108. If the NID 108 is not present or is not ready to be connected, the free end of the drop cable 102 may be stored within the storage receptacle 100 until needed to protect the drop cable 102 from inadvertent damage or direct exposure to adverse environmental conditions. Thus, it is possible to pre-install the drop cable 102 for later use, or if the NID 108 is removed, to store and protect the drop cable 102 within the slack storage receptacle 100 until the NID 108 is re-installed. If the NID 108 is not present, an optional cover plate (not shown) may be secured in its place over the housing of the slack storage receptacle 100.

Figure 5:
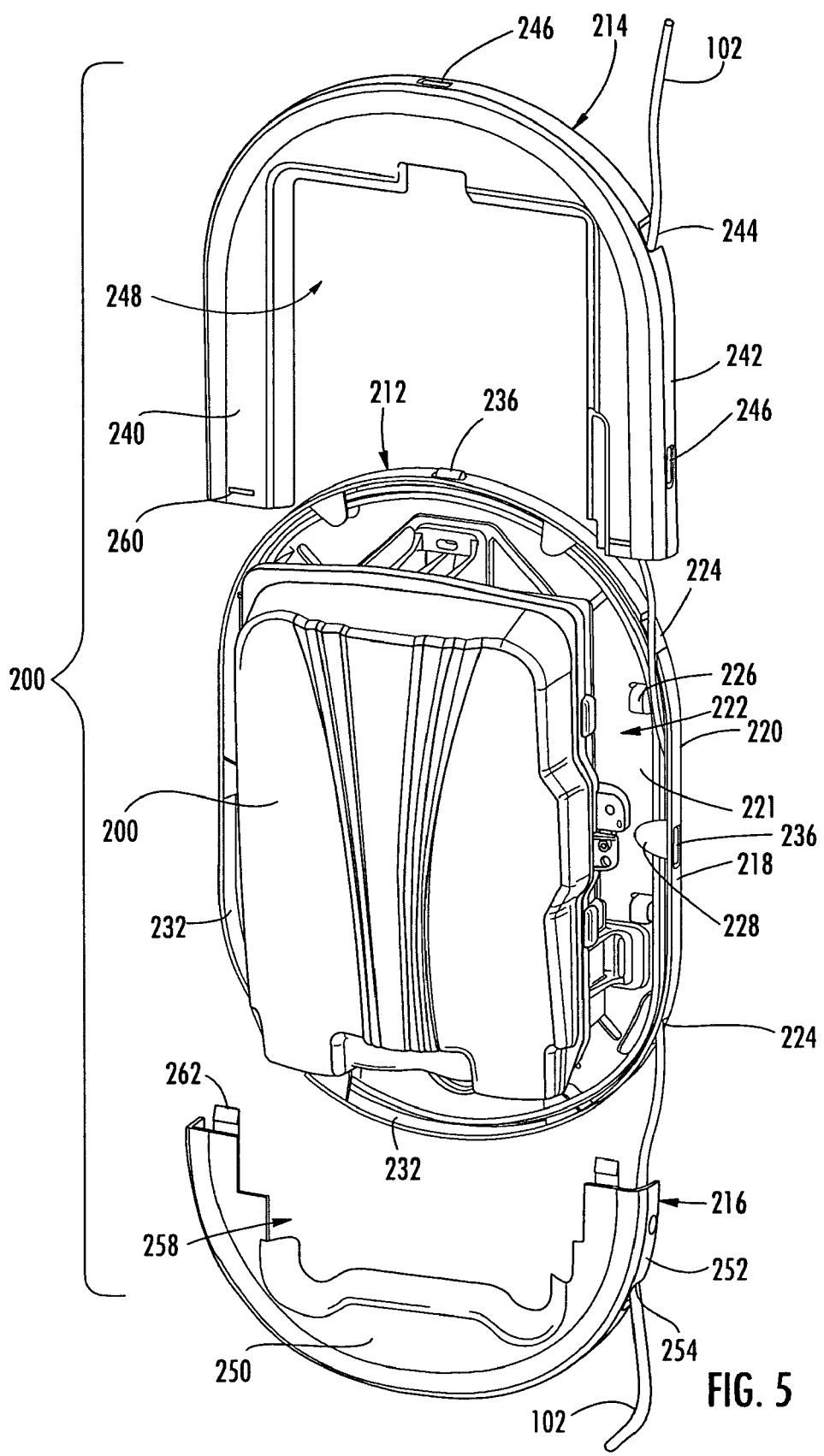
FIG. 5 is a perspective view of a fiber optic drop cable slack storage receptacle for storing an excess length of a pre-connectorized fiber optic drop cable in an optical communications network in accordance with yet another alternative embodiment of the present invention.
Figure 6:
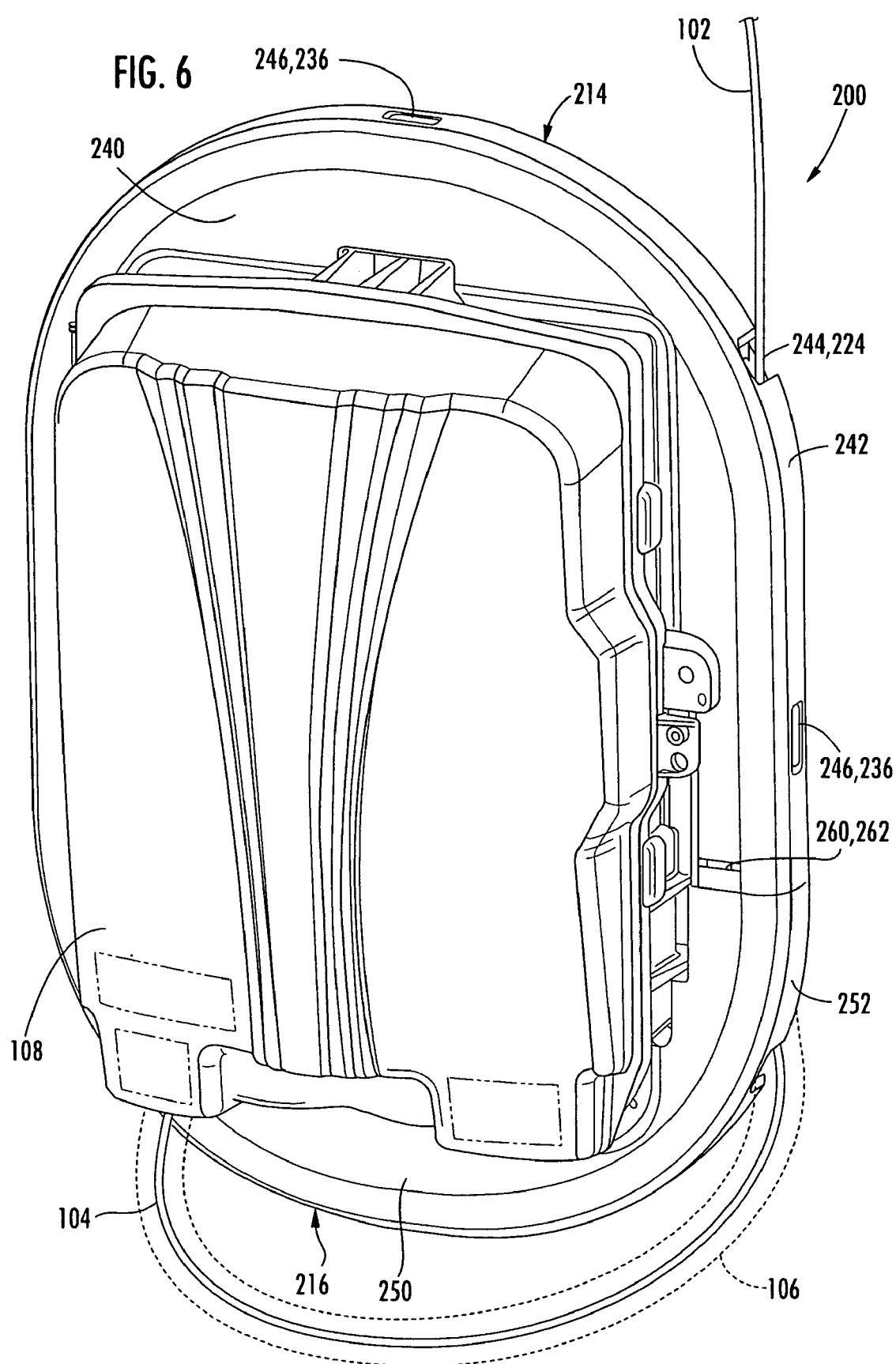
FIG. 6 is a perspective view of the slack storage receptacle of FIG. 5 shown in the assembled configuration and with a conventional NID mounted thereon.

FIGS. 5 and 6 show yet another alternative embodiment of a slack storage receptacle 200 constructed in accordance with the present invention. As best shown in FIG. 5, the slack storage receptacle 200 consists of a housing 212 having a generally oval-shaped configuration, a top cover 214 and a bottom cover 216. Together, the housing 212, the top cover 214 and the bottom cover 216 generally form an oval-shaped structure defining an interior cavity 222 and a cable channel 232, as will be described, for storing one or more coils of excess length of a pre-connectorized fiber optic drop cable 102. The slack storage receptacle 200 is relatively thin and made of a lightweight, yet rigid material such as aluminum, plastic, thermoplastic or composite that is configured to be mounted adjacent to, and preferably surrounding, a conventional NID 108, such as the SABRE® NID available from Corning Cable Systems LLC of Hickory, N.C., shown herein. The slack storage receptacle 200 of this alternative embodiment may have a variety of shapes that are suitable for storing and protecting drop cable slack, but is preferably generally oval-shaped as shown to minimize the amount of space around the NID 108 needed to accommodate the slack storage receptacle 200. Preferably, the slack storage receptacle 200 has a depth dimension that is substantially less than either of its lengthwise or widthwise dimensions.

As shown herein, the housing 212 comprises a generally oval-shaped rear panel 220 and a side wall 218 that together define an interior cavity 222 and an annular cable channel 232. The cable channel 232 is dimensioned to have a minimum radius of curvature equal to or greater than the minimum bend radius of the drop cable 102 and to extend radially beyond the outer periphery of the NID 108. The rear panel 220 comprises a generally planar back wall 221 and the side wall 218 extends outwardly from the back wall 221 substantially continuously along the outer perimeter of the back wall 221. As shown herein, the back wall 221 of the rear panel 220 comprises a first means (not shown) for securing the housing 212 to the exterior wall of a subscriber premises. The first means may comprise, for example, one or more elongate slots provided on the back wall 221 for receiving a conventional fastener, such as a threaded screw or bolt, a wing nut, clasp, clip, or hanger. The back wall 221 of the rear panel 220 further comprises a second means (not shown) for securing the NID 220 to the housing 212. Similarly, the second means may comprise, for example, one or more elongate slots provided on the NID 108 for receiving a conventional fastener, such as a threaded screw or bolt, a wing nut, clasp, clip, or hanger. Preferably, the side wall 218 is provided with a plurality of circumferentially spaced apart retaining flanges 228 affixed to the interior surface of the side wall 218 and extending radially inwardly. Together, the side wall 218 and the retaining flanges 228 form the cable channel 232 for storing coils of the drop cable slack within the housing 212. At least one, and preferably, more than one cable transition opening 224 is provided through the side wall 218 at a predetermined location for transitioning the drop cable slack into or out of the housing 212. One or more cable routing guides 226 may also be provided on the back wall 221 adjacent the side wall 218 to guide and retain the drop cable slack in the cable channel 232. A plurality of projecting studs 236 are located peripherally along the exterior surface of the side wall 218 for engaging corresponding retaining mechanisms 246 provided on the top cover 214 and the bottom cover 216. The projecting studs 236 and the retaining mechanisms 246 securely retain the top and bottom covers 214, 216 in alignment on the housing 212, and thereby form a fully enclosed assembly around the periphery of the NID 108.

The top cover 214 and the bottom cover 216 each comprise a partial front wall 240, 250, respectively, that overlies the rear panel 220 of the housing 212 and an outer wall 242, 252, respectively, that is sized so as to overlap and engage the side wall 218 of the housing 212. The outer wall 242 of the top cover 214 has at least one opening or recess therethrough that defines a cable transition duct 244 for transitioning the drop cable slack into the top cover 214. Similarly, the outer wall 252 of the bottom cover 216 has at least one opening or recess therethrough that defines a cable transition duct 254 for transitioning the drop cable slack out of the bottom cover 216. Each cable transition duct 246, 254 is coincident with a corresponding cable transition opening 224 provided on the side wall 218 of the housing 212 when the top cover 214 and the bottom cover 216 are assembled on the housing 212. Accordingly, the cable transition duct 244 of the top cover 214 and the corresponding cable transition opening 224 of the housing 212 allow the drop cable 102 to enter the slack storage receptacle 200, while the cable transition duct 254 of the bottom cover 216 and the corresponding cable transition opening 224 of the housing 212 allow the drop cable 102 to exit the slack storage receptacle 200. The top cover 214 is provided with at least one retaining mechanism, such as an elongate slot 260, for engaging a corresponding retaining mechanism, such as a latch 262, to securely retain the top cover 214 and the bottom cover 216 together on the housing 212 in the fully assembled configuration previously described. A cutaway portion 248 centrally disposed in the front wall 240 of the top cover 214 is shaped to conform to the outer contour of the upper portion of the NID 108. Similarly, a cutaway portion 258 centrally disposed in the front wall 250 of the bottom cover 216 is shaped to conform to the outer contour of the lower portion of the NID 108. Thus, the top cover 214 and the bottom cover 216 are adapted to cooperate with each other to conform to the contour of the outer periphery of the NID 108 when the latch 262 provided on the bottom cover 216 engages the slot 260 provided on the top cover 214.

As previously described with reference to the embodiments shown in FIGS. 1 and 2 and FIGS. 3 and 4, the alternative embodiment of the slack storage receptacle 200 shown in FIGS. 5 and 6 is adapted to store the drop cable slack externally to the NID 108 at any suitable location between the NID 108 and an outside plant optical connection terminal, for example, an aerial, above-ground or below grade closure. Preferably, the housing 212 is secured to an exterior wall of a subscriber premises utilizing the first mounting means and respective conventional fasteners, the NID 108 is mounted onto the housing 212 using the second mounting means and respective conventional fasteners, and the top and bottom covers 214, 216 are secured on the housing 212 and around the NID 108. Alternatively, the rear panel 220 may be eliminated and the housing 212 consisting of only the side wall 218 may be positioned around a NID 108 already secured to an exterior wall of a subscriber premises. The top cover 214 and the bottom cover 216 can then be secured on the housing 212 and around the NID 108, as previously described. However, the slack storage receptacle 200 may be mounted on the exterior wall of the subscriber premises with or without the NID 108 mounted thereon. Furthermore, the slack storage receptacle 200 may instead be secured in the vicinity of an outside plant connection terminal (not shown) of the optical network at a location remote from the NID 108. For example, but without limitation, the slack storage receptacle 200 may be secured at an aerial location in the vicinity of an aerial closure, at an above-ground location in the vicinity of a telecommunications pedestal, or at a buried location in the vicinity of a below grade closure. Regardless, the drop cable slack is stored external to the NID 108 in a concealed manner to discourage unauthorized access and to protect the drop cable slack from inadvertent damage or direct exposure to adverse environmental conditions.

In an exemplary method, the housing 212 of the slack storage receptacle 200 is first positioned around the outer periphery of the NID 108 already mounted to an exterior wall of a subscriber premises. The pre-connectorized fiber optic drop cable 102 is next connected to and routed from an outside plant connection terminal to the NID 108. The drop cable 102 is then guided through the cable transition duct 244 provided on the top cover 214 and through the upper cable transition opening 224 provided on the side wall 218 of the housing 212 to enter the slack storage receptacle 200. Any excess length of the drop cable 102 is next coiled and inserted into the cable channel 232 between the retaining flanges 228 provided on the side wall 218 in the manner illustrated in FIG. 5. The drop cable slack is inserted and coiled beginning with the portion of the drop cable 102 closest to the connection terminal and enough of the free end of the drop cable 102 is left outside the housing 212 to form a drip loop 104 (FIG. 6) between the slack storage receptacle 200 and the NID 108. The free end of the drop cable 102 is then guided through the lower cable transition opening 224 provided on the side wall 218 of the housing 212 and through the cable transition duct 254 provided on the bottom cover 216 to exit the slack storage receptacle 200. Finally, the top cover 214 and the bottom cover 216 are secured on the housing 212 and around the NID 108 such that the slack storage receptacle 200 is retained between the exterior wall of the subscriber premises and the outer periphery of the NID 108. An elongate, flexible shield 106, indicated generally by the broken lines in FIG. 6, may be positioned over the drip loop 104 for purposes of aesthetics and/or safety. The shield 106 may be made of a thin metal, plastic, thermoplastic or composite material and may be formed as a smooth or corrugated tube having an inner diameter greater than the outer diameter of the fiber optic drop cable 108. Alternatively, the shield 106 may be formed as a pre-molded semi-circular cover secured at each end to the slack storage receptacle 200 and the NID 108. If the NID 108 is not present, the housing 212 including the rear panel 220 can be mounted on the exterior wall of the subscriber premises and the drop cable slack stored within the slack storage receptacle 200 in the manner previously described. If the NID 108 is present, but is not ready to be connected, the free end of the drop cable 102 may be stored within the slack storage receptacle 200 until needed to protect the drop cable 102 from inadvertent damage or direct exposure to adverse environmental conditions. Thus, it is possible to pre-install the drop cable 102 for later use, or if the NID 108 is removed, to store and protect the drop cable 102 within the slack storage receptacle 200 until the NID 108 is re-installed.

Figure 7:
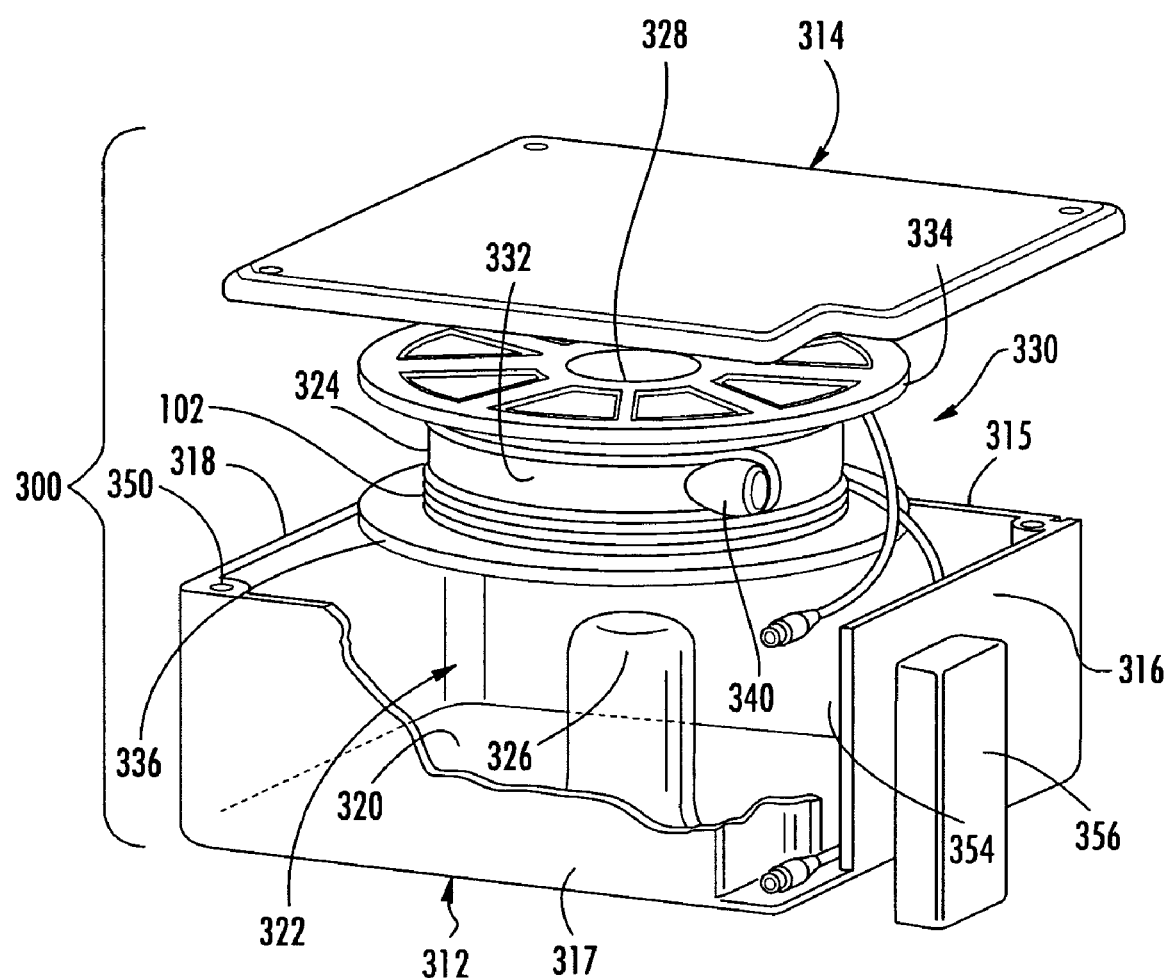
FIG. 7 is a perspective view of a fiber optic drop cable slack storage receptacle for storing an excess length of a pre-connectorized fiber optic drop cable in an optical communications network in accordance with yet another alternative embodiment of the present invention.

FIG. 7 shows yet another alternative embodiment of a slack storage receptacle 300 constructed in accordance with the present invention. The slack storage receptacle 300 consists of a generally box-shaped housing 312, a cover 314 and a storage means 330 disposed within the housing 312. Together, the housing 312 and the cover 314 generally form a rectangular box-shaped structure defining an interior cavity 322 that receives the storage means 330, as will be described, for storing one or more coils of excess length of a pre-connectorized fiber optic drop cable 102. The slack storage receptacle 300 is made of a lightweight, yet rigid material such as aluminum, plastic, thermoplastic or composite that is configured to be buried in the ground adjacent to a conventional NID (not shown), such as the SABRE® NID available from Corning Cable Systems LLC of Hickory, N.C. shown in the previous embodiments. The slack storage receptacle 300 of this alternative embodiment may have a variety of shapes that are suitable for storing and protecting drop cable slack, but is preferably generally box-shaped as shown to facilitate shipping and deployment of the fiber optic drop cable 102, as will be described. Preferably, the slack storage receptacle 300 has a depth dimension that is somewhat less than either of its lengthwise or widthwise dimensions.

The housing 312 comprises a rear panel 320, a top wall 315, a bottom wall 317 and two opposed side walls 316 and 318, which together with the cover 314 define the interior cavity 322. The storage means 330 is approximately centrally disposed within the interior cavity 322 and comprises a hub 326 affixed to the rear panel 320 and a reel 324 for storing the fiber optic drop cable 102. The reel 324 is sized so as to have a radius of curvature equal to or greater than the minimum bend radius of the drop cable 102. The hub 326 extends upwardly from the interior surface of the rear panel 320 and the reel 324 is mounted on the smooth exterior of the hub 326 such that the reel 324 rotates freely relative to the hub 326. As shown, the reel 324 comprises an inner wall 328 adjacent the hub 326 and an outer wall 332 spaced radially outwardly from the inner wall 328. However, the inner wall 328 and the outer wall 332 may be coincident in order to maximize the length of the fiber optic drop cable 102 that can be stored on the reel 324. Regardless, the outer wall 332 defines a generally cylindrical surface for receiving the fiber optic drop cable 102. The reel 324 further comprises a pair of spaced apart flanges 334 and 336 for retaining the fiber optic drop cable 102 on reel 324. The flanges 334, 336 are generally parallel to one another and generally perpendicular to a plane tangent to the outer wall 332. As shown in FIG. 7, the reel 324 also comprises a bend radius guide 340 disposed on the outer wall 332 and extending radially outwardly therefrom. The bend radius guide 340 has a radius of curvature that is greater than the minimum bend radius of the fiber optic cable 102 and thereby permits a factory installer or a field technician to reverse the direction in which the fiber optic drop cable 102 is wound onto or paid off (i.e., unwound) the reel 324. A handle (not shown) may also be provided on the flange 336 adjacent the cover 314 for rotating the reel 324 so that the fiber optic drop cable 102 can be wound onto the reel 324 during manufacturing or assembly and paid off the reel 324 to deploy the fiber optic drop cable 102 between, for example, an outside plant connection terminal in an optical communications network (not shown) and the NID at the subscriber location. In particular, the bend radius guide 340 permits both connectorized ends of the fiber optic drop cable 102 to be paid off the reel 324 in the same direction and at the same time. Accordingly, the slack storage receptacle 300 may be located approximately midway between the connection terminal and the NID to facilitate deployment of the fiber optic drop cable 102.

The storage means 330 may further comprise a securing mechanism (not shown) to secure the reel 324 against rotation relative to the fixed hub 326 within the slack storage receptacle 300 during shipment, as well as to apply a small amount of friction to the reel 324 as the fiber optic drop cable 102 is being paid off during deployment, thereby avoiding unwanted loosening of the drop cable 102 that remains on the reel 324. For protection against adverse environmental conditions during shipping and deployment, the cover 314 may be mounted onto the housing 312 in a sealed manner utilizing a conventional gasket (not shown) and conventional fasteners, such as threaded screw or bolts, received in openings 350 provided in the top, bottom and/or side walls 315, 316, 317, 318 of the housing 312. Although not shown, the cover 314 may be hinged or otherwise restrained for rotational movement relative to the housing 312 and a strap may be provided to limit the movement of the cover 314 relative to the housing 312. Further, the cover 314 and/or the housing 312 may be provided with stiffening ribs (not shown) to prevent distortion. Finally, the bottom wall 315 of the housing 312 has a cable opening 354 through which the drop cable 102 may enter the slack storage receptacle 300 to be wound onto the reel 324 and may exit the slack storage receptacle to be paid off the reel 324. The housing 312 is further provided with a cap 356 for protecting the fiber optic drop cable 102, and in particular the connectorized ends of the drop cable 102, which are stored adjacent the cable opening 352 during shipment. The cap 356 is preferably removable, however, it will be readily appreciated by those skilled in the art that the cap 356 may comprise a flexible material that allows the cap 356 to be moved relative to the remainder of the housing 312, thereby permitting the drop cable 102 to enter and exit the slack storage receptacle 300.

As previously described with reference to the embodiment shown in FIGS. 1 and 2, the alternative embodiment of the slack storage receptacle 300 shown in FIG. 7 is adapted to store the drop cable slack externally to a NID at any suitable location between the NID and an outside plant optical connection terminal, for example, an aerial, aboveground or below grade closure. Preferably, the slack storage receptacle 300 is buried in the ground adjacent a NID located at a subscriber premises. However, the slack storage receptacle 300 may instead be buried in the ground in the vicinity of an outside plant connection terminal (not shown) of the optical network at a location remote from the NID. For example, but without limitation, the slack storage receptacle 300 may be buried in the vicinity of an aerial closure, in the vicinity of a telecommunications pedestal, or in the vicinity of a below grade closure. Regardless, the drop cable slack is stored external to the NID in a concealed manner to discourage unauthorized access and to protect the drop cable slack from inadvertent damage or direct exposure to adverse environmental conditions.

In an exemplary method, the slack storage receptacle 300 is manufactured and factory-assembled for shipment to the service provider. In particular, the fiber optic drop cable 102 is wound onto the reel 324 in, for example, a counterclockwise direction until a sufficient length of the drop cable 102 is stored on the lower portion of the reel 324. The drop cable 102 is then guided around the bend radius guide 340 and the remainder of the drop cable 102 is wound onto the upper portion of the reel 324 in the opposite (i.e., clockwise) direction. The reel 324 is positioned on the hub 326 within the housing 312 with the connectorized ends of the fiber optic drop cable 102 secured within the cap 356 and the cover 314 secured on the housing 312 by conventional fasteners received in openings 350. The pre-assembled slack storage receptacle 300 with the fiber optic drop cable 102 stored therein is then shipped to the site where the fiber optic drop cable 102 is to be deployed, for example, between an outside plant connection terminal and a NID in an optical network, and the slack storage receptacle 300 is positioned at a suitable location, for example, about midway between the connection terminal and the NID. The cap 356 is next removed or opened to provide access to the connectorized ends of the fiber optic drop cable 102. The connectorized ends of the fiber optic drop cable 102 are then paid off the reel 324 by rotating the reel 324 clockwise sufficiently to connect the connectorized ends to the connection terminal and the NID, respectively. The connections are made, and if necessary, the cover 314 is removed and any excess length of the fiber optic drop cable 102 is wound back onto the reel 324, either by rotating the reel 324 counterclockwise or by hand looping the drop cable slack onto the upper and lower portions of the reel 324. The cover 314 is then replaced and the slack storage receptacle 300 is buried underground. Although not essential, the cap 356 may also be replaced if desired. If the NID 108 is not present or is not ready to be connected, the connectorized ends of the drop cable 102 may be stored within the slack storage receptacle 300 until needed to protect the drop cable 102 from inadvertent damage or direct exposure to adverse environmental conditions. Thus, it is possible to pre-install the drop cable 102 for later use, and to bury the slack storage receptacle 300 and the drop cable slack.

Figure 8:
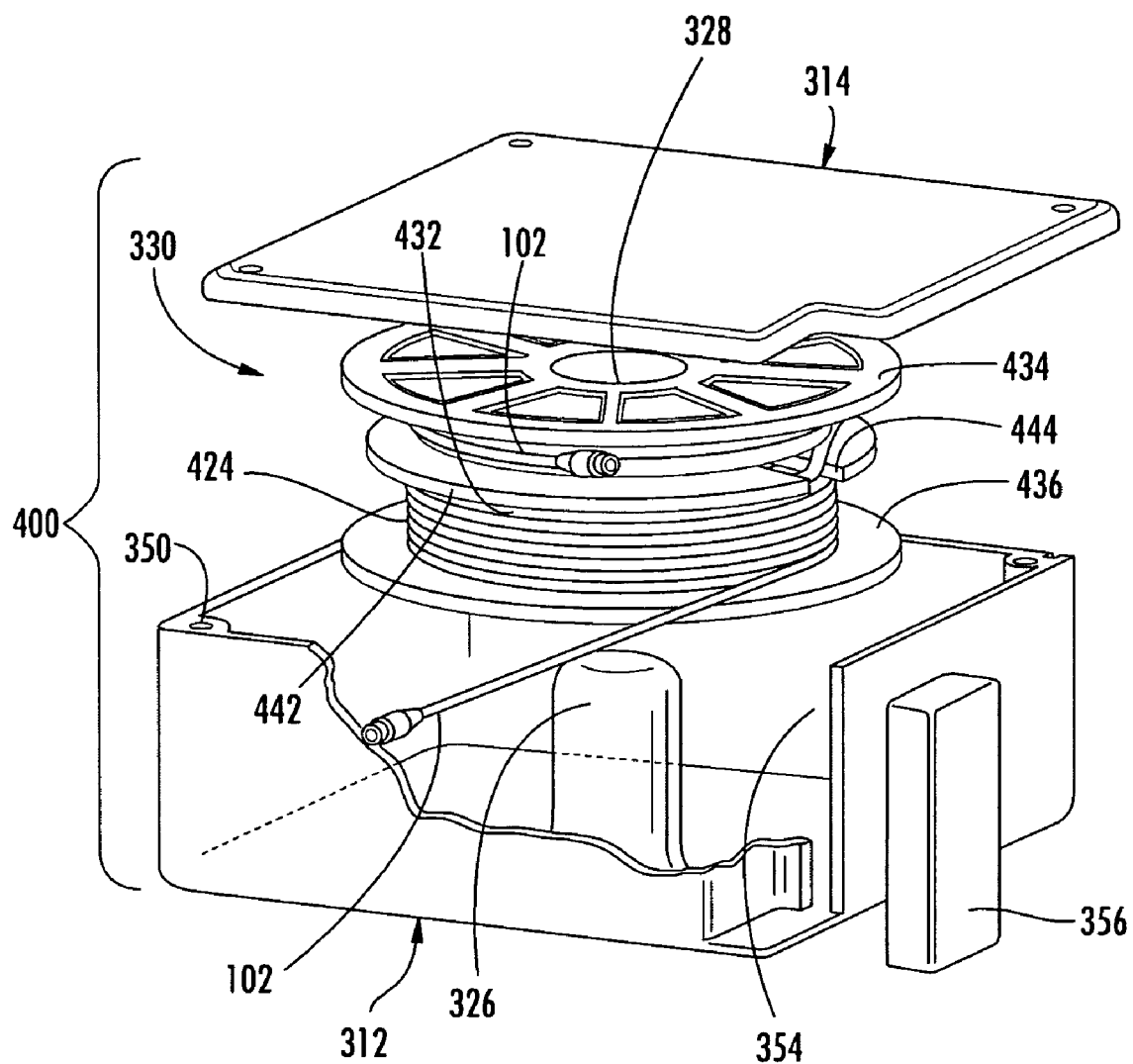
FIG. 8 is a perspective view of a fiber optic drop cable slack storage receptacle for storing an excess length of a pre-connectorized fiber optic drop cable in an optical communications network in accordance with yet another alternative embodiment of the present invention.

FIG. 8 shows yet another alternative embodiment of a slack storage receptacle 400 constructed in accordance with the present invention. The slack storage receptacle 400 is essentially identical to the slack storage receptacle 300 previously described with reference to FIG. 7, except the reel 324 of the storage means 330 is replaced with an alternative reel 424 for storing one or more coils of excess length of a pre-connectorized fiber optic drop cable 102. The reel 424 comprises three spaced apart flanges 434, 436, 442 for retaining the fiber optic drop cable 102 on reel 424. The flanges 434, 436, 442 are generally parallel to one another and generally perpendicular to a plane tangent to the outer wall 432. In particular, the outer flanges 434, 436 are located adjacent the lateral edges of the reel 424 and the inner flange 442 is positioned on the outer wall 432 medially between the outer flanges 434, 436, but preferably nearer to the upper outer flange 434, as shown in FIG. 8. The inner flange 442 has a radially inwardly extending slot 444 therethrough for transitioning the fiber optic drop cable 102 from a lower portion of the reel 424 to an upper portion of the reel 424. The slot 444 permits a factory installer or a field technician to wind a substantially longer length of the fiber optic drop cable 102 onto the lower portion of the reel 424 and to separate the longer length from a shorter length of the fiber optic drop cable 102 that is wound onto the upper portion of the reel 424 in the same direction, for example, counterclockwise. Thus, the connectorized ends of the fiber optic drop cable 102 may not be paid off in the same direction and at the same time, as previously described. Instead, one or the other of the connectorized ends must be paid off and the other end unwound from the reel 424 by hand.

In an exemplary method, the slack storage receptacle 400 is manufactured and factory-assembled for shipment to the service provider. In particular, the fiber optic drop cable 102 is wound onto the lower portion of the reel 424 in, for example, a counterclockwise direction until a sufficient length of the drop cable 102 is stored on the lower portion of the reel 424. The drop cable 102 is then guided through the slot 444 formed in the inner flange 442 and the remainder of the drop cable 102 is wound onto the upper portion of the reel 424 in the same (i.e., counterclockwise) direction. Preferably, the length of the drop cable 102 stored on the lower portion of the reel 424 is substantially longer than the length of the drop cable 102 stored on the upper portion of the reel 424. The reel 424 is positioned on the hub 326 within the housing 312 with the connectorized end of the fiber optic drop cable 102 stored on the lower portion of the reel 424 secured within the cap 356. The connectorized end of the fiber optic drop cable 102 stored on the upper portion of the reel 424 may be secured within the cap 356, but preferably, is secured within the upper portion of the reel 424, as shown in FIG. 8. The cover 314 is then secured on the housing 312 by conventional fasteners received in openings 350. The pre-assembled slack storage receptacle 400 with the fiber optic drop cable 102 stored therein is then shipped to the site where the fiber optic drop cable 102 is to be deployed, for example, between an outside plant connection terminal and a NID in an optical network, and the slack storage receptacle 400 is positioned at a suitable location, for example, adjacent the NID. The cap 356 is next removed or opened to provide access to the connectorized end of the fiber optic drop cable 102 stored on the lower portion of the reel 424. The connectorized end of the fiber optic drop cable 102 stored on the lower portion of the reel 424 is then paid off the reel 424 by rotating the reel 424 in a clockwise direction sufficiently to connect the connectorized end to the connection terminal. The cover 314 is removed and the connectorized end of the fiber optic drop cable 102 stored on the upper portion of the reel 424 is then unwound from the reel 424 by hand in a clockwise direction sufficiently to connect the connectorized end to the NID. The connections are made, and if necessary, any excess length of the fiber optic drop cable 102 is wound back onto the reel 424, either by rotating the reel 424 counterclockwise or by hand looping the drop cable slack onto the upper and lower portions of the reel 424. The cover 314 is then replaced and the slack storage receptacle 400 is buried underground. Although not essential, the cap 356 may also be replaced if desired. If the NID 108 is not present or is not ready to be connected, the connectorized ends of the drop cable 102 may be stored within the slack storage receptacle 400 until needed to protect the drop cable 102 from inadvertent damage or direct exposure to adverse environmental conditions. Thus, it is possible to pre-install the drop cable 102 for later use, and to bury the slack storage receptacle 400 and the drop cable slack. It will be readily appreciated by those skilled in the art that the slack storage receptacle 400 may be located adjacent the connection terminal and the longer length of the fiber optic drop cable 102 may be paid off and connected to the NID, while the shorter length of the fiber optic drop cable 102 is unwound by hand and connected to the connection terminal.

The foregoing is a description of various embodiments of the invention that are provided here by way of example only. Although the fiber optic drop cable slack storage receptacle has been described with reference to preferred embodiments and examples thereof, other embodiments and examples may perform similar functions and/or achieve similar results. All such equivalent embodiments and examples are within the spirit and scope of the present invention and are intended to be covered by the appended claims.

That which is claimed is:

1. A slack storage receptacle for storing an excess length of a pre-connectorized fiber optic drop cable extending between an optical connection terminal and a network interface device (NID), the slack storage receptacle comprising:
a housing defining an interior cavity adapted to receive one or more coils of the excess length of the fiber optic drop cable;
wherein the excess length of the fiber optic drop cable is stored external to the NID;
wherein the housing further comprises a storage means;
wherein the storage means comprises a drawer adapted to cooperate in sliding engagement with the housing for movement between an opened configuration and a closed configuration.

2. A slack storage receptacle according to claim 1, wherein the drawer comprises a rear panel and a plurality of walls extending outwardly from the rear panel and wherein the coils of the excess length of the fiber optic drop cable are biased outwardly against the walls of the drawer.

3. A slack storage receptacle according to claim 2, wherein at least one of the walls comprises an inwardly extending retaining flange for retaining the coils of the excess length of the fiber optic drop cable within the drawer.

4. A slack storage receptacle according to claim 1, wherein the housing comprises a pair of locking pins and the drawer has a plurality of openings therethrough that cooperate with the locking pins in the closed configuration and the opened configuration such that one of the openings is coincident with one of the locking pins in each of the closed configuration and the opened configuration.

5. A slack storage receptacle according to claim 4, wherein the drawer comprises a top wall that is provided with angled guiding tabs at the opposed ends thereof for permitting the drawer to travel past a corresponding one of the locking pins while being moved from the opened configuration to the closed configuration.

6. A slack storage receptacle according to claim 5
wherein the plurality of openings comprise a pair of openings located adjacent one end of the top wall and a single opening located adjacent the opposed end of the top wall;
wherein the pair of locking pins comprises a first locking pin for engaging one of the pair of openings in the closed configuration and the single opening in the opened configuration when the drawer is slid in a first direction relative to the housing and a second locking pin for engaging the other one of the pair of openings in the opened configuration when the drawer is slid in a second direction opposite the first direction relative to the housing; and wherein only one of the locking pins engages one of the openings in the closed configuration and the opened configuration.

7. A slack storage receptacle for storing an excess length of a pre-connectorized fiber optic drop cable extending between an optical connection terminal and a network interface device (NID), the slack storage receptacle comprising:

a housing defining an interior cavity adapted to receive one or more coils of the excess length of the fiber optic drop cable;

wherein the excess length of the fiber optic drop cable is stored external to the NID;

wherein the housing further comprises a storage means;

wherein the housing comprises at least one cable entrance and exit opening and wherein the storage means comprises an inner hub and an outer hub spaced radially outwardly from the inner hub to form a cable channel in communication with the cable entrance and exit opening for receiving the coils of the excess length of the fiber optic drop cable within the housing.

8. A slack storage receptacle for storing an excess length of a pre-connectorized fiber optic drop cable extending between an optical connection terminal and a network interface device (NID), the NID defining an exterior surface, the slack storage receptacle comprising:

a housing defining an interior cavity adapted to receive one or more coils of the excess length of the fiber optic drop cable;

wherein the housing is provided outside the exterior surface of the NID such that the excess length of the fiber optic drop able is stored external to the NID;

wherein the housing further comprises a storage means;

wherein the housing further comprises a mounting feature including a hanger for hingedly affixing the NID to the housing such that the NID can be rotated upwardly relative to the housing to expose the excess length of the fiber optic drop cable stored within the slack storage receptacle.

9. A slack storage receptacle for storing an excess length of a pre-connectorized fiber optic drop cable extending between an optical connection terminal and a network interface device (NID), the NID defining an exterior surface, the slack storage receptacle comprising:

a housing defining an interior cavity adapted to receive one or more coils of the excess length of the fiber optic drop cable;

wherein the housing is provided outside the exterior surface of the NID such that the excess length of the fiber optic drop cable is stored external to the NID;

wherein the housing further comprises a storage means;

wherein the storage means comprises a continuous side wall having at least one cable transition opening therethrough and a plurality of circumferentially spaced apart retaining flanges affixed to the side wall and extending radially inwardly therefrom such that the side wall and the retaining flanges form an annular cable channel for receiving the coils of the excess length of the fiber optic drop cable; and further comprising a top cover and a bottom cover, each of the top cover and the bottom cover comprising a front wall defining a cutaway portion centrally disposed in the front wall that is shaped to conform to the outer contour of the NID such that the top cover and the bottom cover are adapted to cooperate with each other to conform to the contour of the outer periphery of the NID when the top cover and the bottom cover ate positioned over the housing and secured together.

10. A slack storage receptacle for storing an excess length of a pre-connectorized fiber optic drop cable extending between an optical connection terminal and a network interface device (NID), the NID defining an exterior surface, the slack storage receptacle comprising:

a housing defining an interior cavity adapted to receive one or more coils of the excess length of the fiber optic drop cable;

wherein the housing is provided outside the exterior surface of the NID such that the excess length of the fiber optic drop cable is stored external to the NID;

wherein the housing further comprises a storage means;

wherein the storage means comprises a continuous side wall having at least one cable transition opening therethrough and a plurality of circumferentially spaced apart retaining flanges affixed to the side wall and extending radially inwardly therefrom such that the side wall and the retaining flanges form an annular cable channel for receiving the coils of the excess length of the fiber optic drop cable;

wherein the housing further comprises a rear panel affixed to the side wall for mounting the slack storage receptacle on an exterior wall of a subscriber premises.

11. A slack storage receptacle for storing an excess length of a pre-connectorized fiber optic drop cable extending between an optical connection terminal and a network interface device (NID), the slack storage receptacle comprising:

a housing defining an interior cavity adapted to receive one or more coils of the excess length of the fiber optic drop cable;

wherein the excess length of the fiber optic drop cable is stored external to the NID;

wherein the housing further comprises a storage means;

wherein the storage means comprises a hub affixed to the housing and a reel for receiving the coils of the excess length of the fiber optic drop cable thereon and wherein the reel is mounted on the hub such that the reel rotates freely relative to the hub.

12. A slack storage receptacle according to claim 11, wherein the reel comprises an inner wall adjacent the hub and an outer wall spaced radially outwardly from the inner wall that defines a generally cylindrical surface for receiving the coils of the excess length of the fiber optic drop cable thereon; and a pair of spaced apart outer flanges for retaining the fiber optic drop cable on the outer wall of the reel.

13. A slack storage receptacle according to claim 12, wherein the reel further comprises a bend radius guide disposed on the outer wall and extending radially outwardly therefrom, the bend radius guide having a radius of curvature that is greater than the minimum bend radius of the fiber optic drop cable for reversing the direction in which the fiber optic drop cable is wound onto the reel.

14. A slack storage receptacle according to claim 13, wherein each end of the fiber optic drop cable has a connectorized end and wherein the fiber optic drop cable may be paid off the reel by pulling the connectorized ends in the same direction and at the same time.

15. A slack storage receptacle according to claim 12, wherein the reel further comprises an inner flange positioned on the outer wall and disposed medially between the outer flanges, the inner flange having a radially inwardly extending slot therethrough for transitioning the fiber optic drop cable from a lower portion of the reel to an upper portion of the reel.

16. A slack storage receptacle according to claim 15, wherein the inner flange is disposed nearer to an upper one of the outer flanges and wherein the slot separates a substantially longer length of the fiber optic drop cable to be wound onto the lower portion of the reel and a shorter length of the fiber optic drop cable wound onto the upper portion of the reel in the same direction.

17. A slack storage receptacle according to claim 16 wherein each end of the fiber optic drop cable has a connectorized end and wherein the fiber optic drop cable must be paid off the reel by pulling one of the connectorized ends in a first direction and by unwinding the other of the connectorized ends by hand in a second direction opposite the first direction.

18. A slack storage receptacle for storing an excess length of a pre-connectorized fiber optic drop cable extending between an optical connection terminal and a network interface device (NID), the NID defining an exterior surface, the slack storage receptacle comprising:
   a housing defining an interior cavity adapted to receive one or more coils of the excess length of the fiber optic drop cable;
   wherein the housing is provided outside the exterior surface of the NID such that the excess length of the fiber optic drop cable is stored external to the NID;
   wherein the housing is secured on an exterior wall of a subscriber premises between the exterior wall and the NID and wherein the NID is mounted on the housing.

19. A slack storage receptacle for storing an excess length of a pre-connectorized fiber optic drop cable extending between an optical connection terminal and a network interface device (NID), the NID defining an exterior surface, the slack storage receptacle comprising:
   a housing defining an interior cavity adapted to receive one or more coils of the excess length of the fiber optic drop cable;
   wherein the housing is provided outside the exterior surface of the NID such that the excess length of the fiber optic drop cable is stored external to the NID;
   wherein the housing is secured on an exterior wall of a subscriber premises between the exterior wall and the NID and wherein the NID is hingedly affixed to the slack storage receptacle and adapted to rotate upwardly relative to the housing.

20. A slack storage receptacle for storing an excess length of a pre-connectorized fiber optic drop cable extending between an optical connection terminal and a network interface device (NID), the NID defining an exterior surface, the slack storage receptacle comprising:
   a housing defining an interior cavity adapted to receive one or more coils of the excess length of the fiber optic drop cable;
   wherein the housing is provided outside the exterior surface of the NID such that the excess length of the fiber optic drop cable is stored external to the NID;
   wherein the NID is secured on an exterior wall of a subscriber premises and wherein the slack storage receptacle is positioned around the NID and adapted to conform to the outer periphery of the NID.

21. A slack storage receptacle for storing an excess length of a pre-connectorized fiber optic drop cable extending between an optical connection terminal and a network interface device (NID), the NID defining an exterior surface, the slack storage receptacle comprising:
   a housing defining an interior cavity adapted to receive one or more coils of the excess length of the fiber optic drop cable;
   wherein the housing is provided outside the exterior surface of the NID such that the excess length of the fiber optic drop cable is stored external to the NID;
   wherein the NID is secured on an exterior wall of a subscriber premises and wherein the slack storage receptacle is buried under the ground.

22. A slack storage receptacle for storing an excess length of a pre-connectorized fiber optic drop cable comprising:
   a housing defining an interior cavity and comprising a storage means disposed within the interior cavity for receiving at least a portion of the fiber optic drop cable external to an outside plant optical connection terminal and a network interface device (NID), the NID defining an exterior surface;
   wherein the housing is secured to an exterior wall of a subscriber premises between the exterior wall and the exterior surface of the NID and wherein the NID is mounted on the housing.

23. A slack storage receptacle for storing an excess length of a pre-connectorized fiber optic drop cable comprising:
   a housing defining an interior cavity and comprising a storage means disposed within the interior cavity for receiving at least a portion of the fiber optic drop cable external to an outside plant optical connection terminal and a network interface device (NID), the NID defining an exterior surface;
   wherein the housing is secured on an exterior wall of a subscriber premises between the exterior wall and the exterior surface of the NID and wherein the NID is hingedly affixed to the slack storage receptacle and adapted to rotate upwardly relative to the housing.

24. A slack storage receptacle for storing an excess length of a pre-connectorized fiber optic drop cable comprising:
   a housing defining an interior cavity and comprising a storage means disposed within the interior cavity for receiving at least a portion of the fiber optic drop cable external to an outside plant optical connection terminal and a network interface device (NID), the NID defining an exterior surface;
   wherein the NID is secured on an exterior wall of a subscriber premises and wherein the slack storage receptacle is positioned around and external to the exterior surface of the NID and adapted to conform to the outer periphery of the NID.

25. A slack storage receptacle for storing an excess length of a pre-connectorized fiber optic drop cable comprising:
   a housing defining an interior cavity and comprising a storage means disposed within the interior cavity for receiving at least a portion of the fiber optic drop cable external to an outside plant optical connection terminal and a network interface device (NID), the NID defining an exterior surface;
   wherein the NID is secured to an exterior wall of a subscriber premises and wherein the slack storage device is buried under the ground, such that the housing is provided outside the exterior surface of the NID.

26. A slack storage receptacle for storing an excess length of a pre-connectorized fiber optic drop cable extending between an optical connection terminal and a network interface device (NID), the slack storage receptacle comprising:

a housing defining an interior cavity adapted to receive one or more coils of the excess length of the fiber optic drop cable;

wherein the excess length of the fiber optic drop cable is stored external to the NID; and further comprising a drip loop extending between the housing and the NID and a shield covering the drip loop.

27. A method of deploying a pre-connectorized fiber optic drop cable between an outside plant optical connection terminal and a network interface device (NID), the method comprising:

providing a slack storage receptacle comprising a housing defining an interior cavity and including a storage means disposed within the interior cavity for receiving an excess length of the fiber optic drop cable;

connecting one end of the fiber optic drop cable to the connection terminal;

connecting the other end of the fiber optic drop cable to the NID; and storing the excess length of the fiber optic drop cable on the storage means of the slack storage receptacle external to the NID.

28. A method according to claim 27, further comprising securing the housing on an exterior wall of a subscriber premises between the exterior wall and the NID and mounting the NID on the housing.

29. A method according to claim 27, further comprising securing the housing on an exterior wall of a subscriber premises between the exterior wall and the NID and hingedly affixing the NID to the slack storage receptacle such that the NID is adapted to rotate upwardly relative to the housing.

30. A method according to claim 27, wherein the slack storage receptacle is adapted to conform to the outer periphery of the NID and further comprising securing the NID on an exterior wall of a subscriber premises and positioning the slack storage receptacle around the NID.

31. A method according to claim 27, further comprising securing the NID on an exterior wall of a subscriber premises and burying the slack storage receptacle under the ground.

32. A method according to claim 27, wherein the storage means comprises a hub affixed to the housing and a reel rotatably mounted on the hub and further comprising:

preassembling the slack storage receptacle with the fiber optic drop cable wound on the reel;

shipping the slack storage receptacle including the fiber optic drop cable wound on the reel;

positioning the slack storage receptacle at a location about midway between the connection terminal and the NID; and paying off the fiber optic drop cable to the connection terminal and the NID by pulling the connectorized ends of the fiber optic drop cable in the same direction and at the same time to unwind the fiber optic drop cable from the reel.

33. A method according to claim 27, wherein the storage means comprises a hub affixed to the housing and a reel rotatably mounted on the hub and further comprising:

preassembling the slack storage receptacle with the fiber optic drop cable wound on the reel;

shipping the slack storage receptacle including the fiber optic drop cable wound on the reel;

positioning the slack storage receptacle at a location between the connection terminal and the NID adjacent the NID; and paying off the fiber optic drop cable to the connection terminal and the NID by pulling one of the connectorized ends of the fiber optic drop cable in the direction of the connection terminal to unwind the fiber optic drop cable from the reel and by unwinding the other connectorized end of the fiber optic drop cable off the reel by hand in the direction of the NID.

* * * * *